US008494008B2

(12) United States Patent
Wada

(10) Patent No.: US 8,494,008 B2
(45) Date of Patent: Jul. 23, 2013

(54) MULTIPLEXING CIRCUIT AND DESIGNING METHOD THEREFOR

(75) Inventor: Kouji Wada, Tokyo (JP)

(73) Assignee: National University Corporation the University of Electro-Communications, Tokyo (JP)

( * ) Notice: Subject to any disclaimer, the term of this patent is extended or adjusted under 35 U.S.C. 154(b) by 869 days.

(21) Appl. No.: 12/065,630

(22) PCT Filed: Aug. 31, 2006

(86) PCT No.: PCT/JP2006/317267

§ 371 (c)(1), (2), (4) Date: Mar. 4, 2008

(87) PCT Pub. No.: WO2007/029601

PCT Pub. Date: Mar. 15, 2007

(65) Prior Publication Data

US 2009/0147805 A1 Jun. 11, 2009

(30) Foreign Application Priority Data

Sep. 5, 2005 (JP) ................................ 2005-257186

(51) Int. Cl.
*H04J 1/02* (2006.01)

(52) U.S. Cl.
USPC .......................................................... 370/497

(58) Field of Classification Search
USPC .......................................... 370/497, 539, 540
See application file for complete search history.

(56) References Cited

U.S. PATENT DOCUMENTS

| | | | | |
|---|---|---|---|---|
| 4,091,344 | A * | 5/1978 | LaTourrette | 333/134 |
| 4,686,496 | A * | 8/1987 | Syrett et al. | 333/202 |
| 4,839,617 | A * | 6/1989 | Speake | 333/174 |
| 5,442,330 | A * | 8/1995 | Fuller et al. | 333/204 |
| 6,184,760 | B1 | 2/2001 | Wada et al. | |
| 6,326,865 | B1 * | 12/2001 | Kundu et al. | 333/202 |
| 7,190,970 | B2 * | 3/2007 | Ochii et al. | 455/553.1 |
| 7,447,305 | B2 * | 11/2008 | Lofmark | 379/378 |

FOREIGN PATENT DOCUMENTS

JP 62-40810 2/1987

(Continued)

OTHER PUBLICATIONS

Kouji Wada et al; "A Class of a Planar Duplexer Consisting of BPFs with Attenuation Poles Designed by Manipulating Tapped Resonators", IEICE Trans. Electron, vol. E86-C, No. 8, Aug. 2003, pp. 1613-1620.

(Continued)

*Primary Examiner* — Mark Rinehart
*Assistant Examiner* — Mohammad Anwar
(74) *Attorney, Agent, or Firm* — Ladas & Parry LLP

(57) ABSTRACT

The present invention includes two or more bandpass filters, for passing signals of mutually different frequency bands therethrough, including one or more stages of units having coupling devices and resonance circuits coupled, in a tap type, to the coupling device, one end of each bandpass filter is directly connected to a common port, the coupling device and the resonance circuit of the first stage nearest to the port of each bandpass filter has a function of impedance matching means for each bandpass filter, in addition to a function of resonance means, respectively.

6 Claims, 19 Drawing Sheets

FOREIGN PATENT DOCUMENTS

| | | |
|---|---|---|
| JP | 02-199901 | 8/1990 |
| JP | 06-045806 | 2/1994 |
| JP | 09-294002 | 11/1997 |
| JP | 10-041704 | 2/1998 |
| JP | 11-340706 | 12/1999 |
| JP | 2002-280862 | 9/2002 |

OTHER PUBLICATIONS

International Search Report PCT/JP2006/317267.
Takanobu Ohno, et al; "A Planar Duplexer Consisting of Mixed Bandpass Filters Using Different Tapped Resonators", 33rd European Microwave Conference, 2003, pp. 163-166.

* cited by examiner (A)

(B)

(A)

(B)

(C)

(D)

(E)

MULTIPLEXING CIRCUIT AND DESIGNING METHOD THEREFOR

TECHNICAL FIELD

The present invention relates to a multiplexing circuit and a designing method therefor, and, in particular, to a filter circuit having bandpass filter characteristics, a multiplexing circuit having a plurality of the filter circuits, and a designing method therefor.

BACKGROUND ART

An antenna duplexer shares a single antenna for transmission and reception, thus, is a type of a multiplexing circuit distributing transmission/reception signals, avoids external radiation and reception of spurious from transmission and reception bands, reduces external reception interference, and protects a reception side circuit at a time of transmission.

FIG. 1 shows a circuit configuration diagram of one example of a conventional antenna duplexer. In FIG. 1, to an antenna 1, one ends of distributed constant lines 2 and 3 are connected. The other end of the distributed constant line 2 is connected to a transmission port 5 through a transmission side bandpass filter 4. The other end of the distributed constant line 3 is connected to a reception port 7 through a reception side bandpass filter 6 (for example, the non-patent document 1).

When the antenna duplexer of FIG. 1 is designed, first the transmission side bandpass filter 4 and the reception side bandpass filter 6 are designed respectively, and then, the distributed constant lines 2 and 3 are designed respectively in such a manner that formulas (1) and (2) are met.

It is noted that $\omega_{01}$ denotes a center angular frequency of the transmission side bandpass filter 4, $\omega_{02}$ denotes a center angular frequency of the reception side bandpass filter 6, $Y_{in1}$ denotes admittance viewed from the antenna 1 at the center angular frequency $\omega_{01}$, $Y_{in2}$ denotes admittance viewed from the antenna 1 at the center angular frequency $\omega_{02}$, Re[ ] denotes a real part of the inside of the bracket, and Im[ ] denotes an imaginary part of the inside of the bracket.

$$\mathrm{Re}[Y_{in1}]|_{\omega=\omega_{02}}=0, \mathrm{Im}[Y_{in1}]|\omega=\omega_{02}=0 \quad (1)$$

$$\mathrm{Re}[Y_{in2}]|_{\omega=\omega_{01}}=0, \mathrm{Im}[Y_{in2}]|_{\omega=\omega_{01}}=0 \quad (2)$$

It is noted that, in the patent document 1, it is described that a reception filter connected to a multiplexing circuit from an antenna includes a dielectric filer and a SAW filter connected thereto in a branching manner, and a transmission filter connected to the multiplexing circuit includes a dielectric filter.

Further, in the patent document 2, it is described that, a tap coupling type duplexer is used to form many attenuation poles at arbitrary frequencies.

Patent Document 1: Japanese Laid-Open Patent Application No. 10-41704

Patent Document 2: Japanese Laid-Open Patent Application No. 11-340706

Non-patent Document 1: K. Wada, T. Ohno, and O. Hashimoto: "A Class of a Planar Duplexer Consisting of BPFs with Attenuation Poles by Manipulating Tapped Resonators "IEICE Trans. On Electronics, Vol. E86-C, PP. 1613-1620 (2003-9).

DISCLOSURE OF THE INVENTION

Problem to be Solved by the Invention

The conventional antenna duplexer shown in FIG. 1 has the distributed constant lines 2, 3, and thus, the number of components is large. However, when merely the distributed constant lines 2, 3 are removed, the desired filter characteristics cannot be obtained and, as a result, it becomes very complicate and difficult to design to take impedance matching as a whole.

The present invention has been devised in consideration of this point, and, a comprehensive object of the present invention is to provide a multiplexing circuit in which the number of components can be reduced, and also, which can be easily designed, and to provide a designing method therefor.

Means to Solve the Problem

In order to solve the problem, a multiplexing circuit according to the present invention has two or more bandpass filters, for passing signals of mutually different frequency bands therethrough, which have one or more stages of units each having a coupling device and a resonance circuit coupled thereto in a tap type, one end of each bandpass filter is directly connected to a common port, and the coupling device and the resonance circuit of the first stage of each bandpass filter nearest to the port has a function of impedance matching means for each bandpass filter, in addition to a function of resonance means, respectively.

Advantageous Effects of the Invention

In the multiplexing circuit, it is possible to reduce the number of components thereof, and to design the multiplexing circuit easily in a short time.

DESCRIPTION OF REFERENCE NUMERALS

Figure 1:
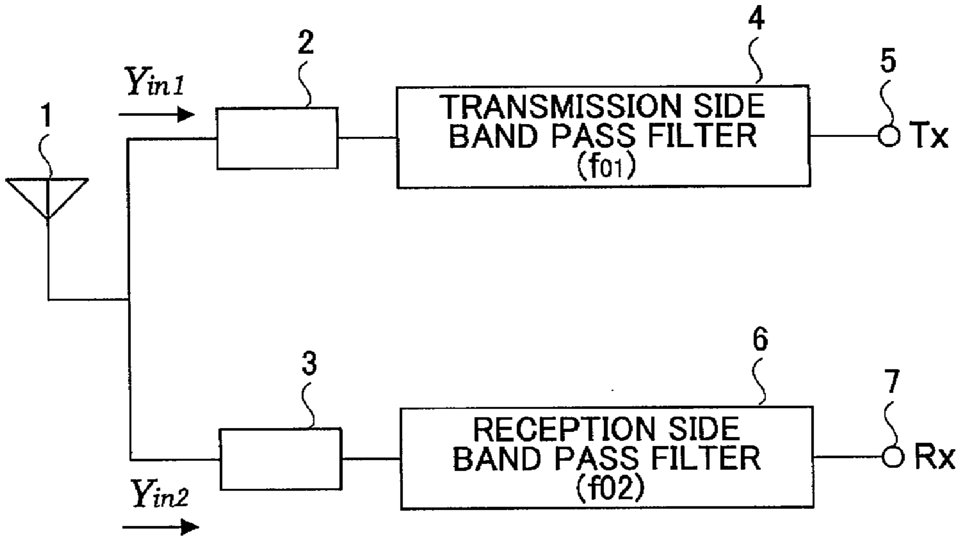
FIG. 1 shows a configuration of one example of a conventional antenna duplexer.

11, 21, 200 ANTENNA
12A, 12B, 14A, 14B, 16A, 16B COUPLING DEVICE
13A, 13B, 15A, 15B RESONANCE CIRCUIT
22, 24, 26, 28, 30, 32, 43, 44, 301 through 304, 701 through 704, 801 through 804 CAPACITOR
23, 25, 29, 31, 40, 41, 305 through 307, 705 through 707, 805 through 807 TAP COUPLING TYPE RESONATOR
34, 35, 36, 37, 42, 45 INDUCTOR
400, 300 TRANSMISSION SIDE BANDPASS FILTER
600, 700, 800 RECEPTION SIDE BANDPASS FILTER

BEST MODE FOR CARRYING OUT THE PRESENT INVENTION

Below, embodiments of the present invention will be described based on figures.

Figure 2:
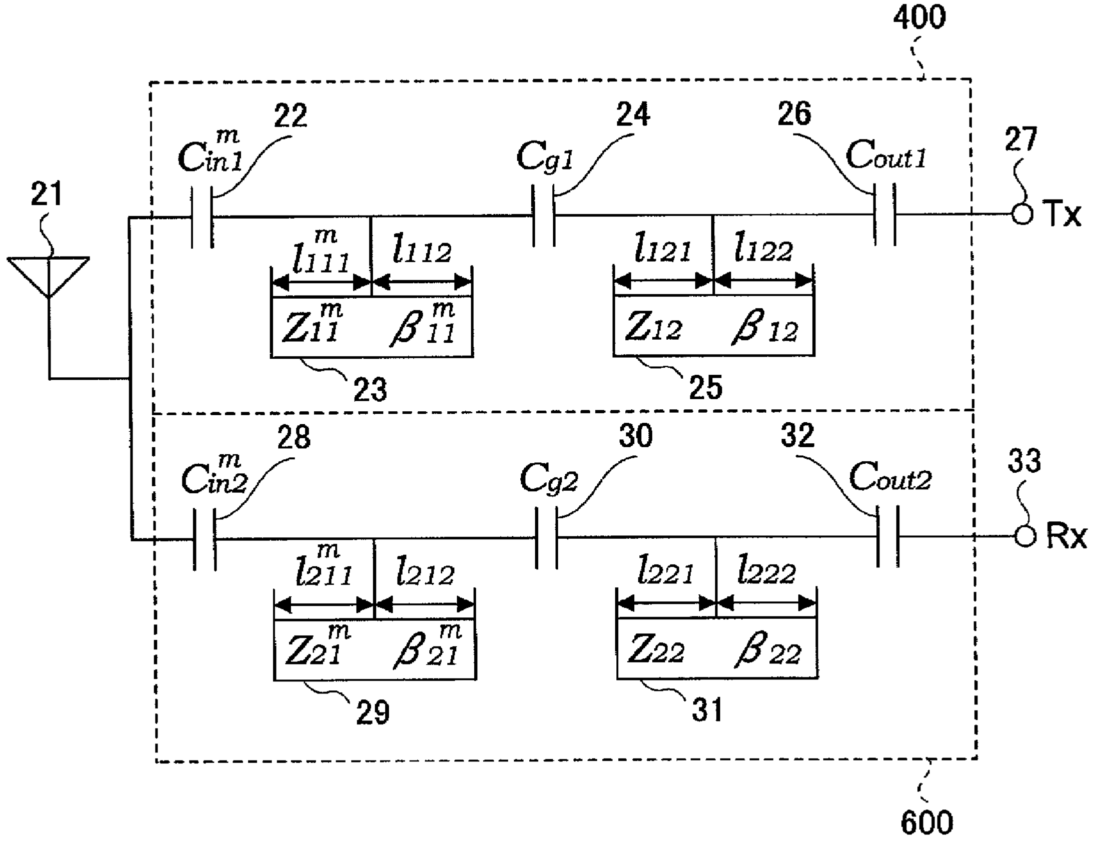
FIG. 2 shows a circuit configuration diagram of one embodiment of an antenna duplexer which is a multiplexing circuit of the present invention.

FIG. 2 shows a principle diagram of an antenna duplexer as a multiplexing circuit of the present invention. In the figure, to an antenna 1, a transmission side bandpass filter 400 and a reception side bandpass filter 600 are directly connected without insertion of distributed constant lines for impedance matching.

The bandpass filters 400 and 600 respectively have capacitors 22, 24, 26, 28, 30 and 32 as coupling devices, and resonators 23, 25, 29 and 31 as resonance circuits. The resonators 23, 25, 29, 31 are coupled to the capacitors 22, 24, 26, 28, 30, 32 in a tap type. There, the capacitor 22 and the resonator 23, the capacitor 24 and the resonator 25, the capacitor 28 and the resonator 29, the capacitor 30 and the resonator 31, are referred to as units, respectively.

In more detail, to the antenna 21, one ends of the capacitors 22, 28 are connected. To the other end of the capacitor 22, the resonator 23 is connected. To the resonator 23, one end o the capacitor 24 is connected. To the other end of the capacitor 24, the resonator 25 is connected. To the resonator 25, one end of the capacitor 26 is connected. To the other end of the capacitor 26, a transmission port 27 is connected.

To the other end of the capacitor 28, the resonator 29 is connected. To the resonator 29, one end of the capacitor 30 is connected. To the other end of the capacitor 30, the resonator 31 is connected. To the resonator 31, one end of the capacitor 32 is connected. To the other end of the capacitor 32, a reception port 33 is connected.

In FIG. 2, filter characteristics of the transmission side bandpass filter including the capacitors 22, 24 and 26 and the resonators 23 and 25 are assumed as Butterworth characteristics. For example, a central frequency $f_{01}$ is assumed as 1.5 GHz, a band width $\Delta f_{01}$ is assumed as 60 MHz, an attenuation pole by the resonator 23 is assumed as 2.0 GHz, and an attenuation pole by the resonator 25 is assumed as 1.0 GHz.

Filter characteristics of the reception side bandpass filter including the capacitors 28, 30, 32 and the resonators 29, 31 are assumed as Butterworth characteristics. For example, a central frequency $f_{02}$ is assumed as 2 GHz, a band width $\Delta f_{02}$ is assumed as 60 MHz, an attenuation pole by the resonator 29 is assumed as 1.5 GHz, and an attenuation pole by the resonator 31 is assumed as 2.5 GHz.

The resonators 23, 29 are designed in such a manner as to have, in addition to a function of resonators, a function of impedance matching means together with the capacitors 22, 28.

Below, a designing method for the antenna duplexer in the present embodiment will be described.

First, capacitances $C_{g1}$, $C_{g2}$, characteristic impedances $Z_{12}$, $Z_{22}$, phase constants $\beta_{12}$, $\beta_{22}$, lengths $l_{121}$, $l_{122}$, $l_{221}$, $l_{222}$ of stubs corresponding to coupling positions of the resonators of the capacitors 24, 30 and the resonators 25, 31, and lengths $l_{112}$, $l_{212}$ of stubs of the resonators 23, 29 are designed in such a manner as to obtain desired characteristics as the transmission side bandpass filter and the reception side bandpass filter. A known method may be used for the design. Especially, as to $l_{112}$, $l_{212}$, the method described in 'K. Wada, O. Hashimoto: "Fundamentals of open-ednded resonators and their application to microwave filters "IEICE Transactions on Electronics, Vol. E83-C, No. 11, pp. 1763-1776 (2000-11)' may be used, $l_{112}$ may be designed to generate an attenuation pole at a frequency corresponding to the frequency $f_{02}$, and $l_{212}$ may be designed to generate an attenuation pole at a frequency corresponding to the frequency $f_{01}$.

Figure 3:
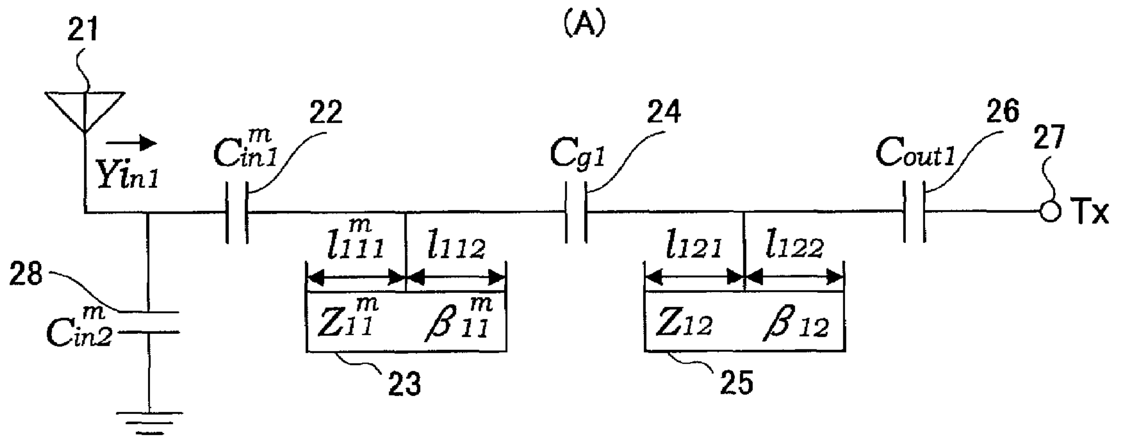
FIG. 3 shows an equivalent circuit of FIG. 2.
Figure 3:
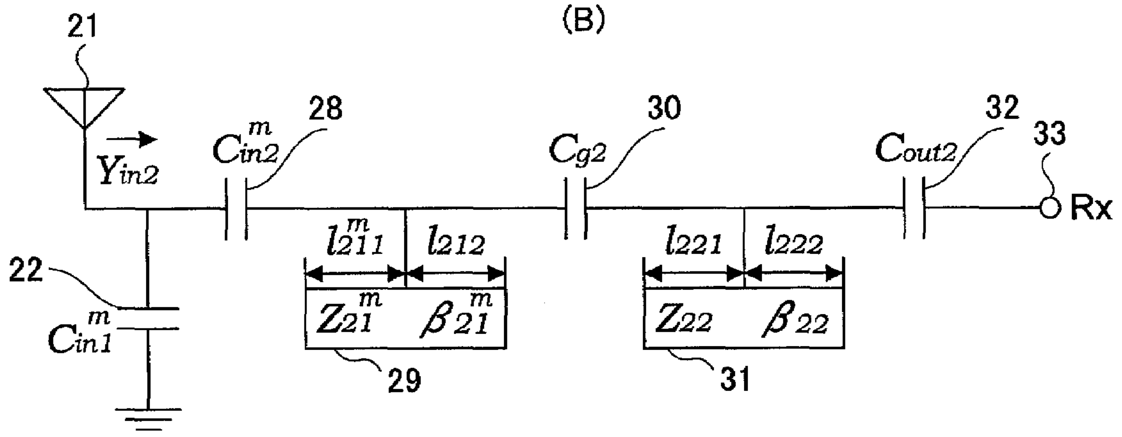

Next, in the center frequency $f_{01}$, design is carried out in such a manner that, as shown in FIG. 3 (A), a contact point between the capacitor 28 and the resonator 29 is in a grounded state, and a transmission signal component is prevented from leaking to the reception port. In the center frequency $f_{02}$, design is carried out in such a manner that, as shown in FIG. 3 (B), a contact point between the capacitor 22 and the resonator 23 is in a grounded state, and a reception signal component is prevented from leaking to the transmission port.

Capacitances $C^{m}_{in1}$, $C^{m}_{in2}$, characteristic impedances $Z^{m}_{11}$, $Z^{m}_{21}$, phase constants $\beta^{m}_{11}$, $\beta^{m}_{21}$, and lengths $l^{m}_{111}$, $l^{m}_{211}$, $l_{221}$, $l_{222}$ of stubs of the capacitors 22, 28 and the resonators 23, 29 are derived in such a manner that impedance matching is taken for the transmission side bandpass filter 400 and the reception side bandpass filter 600.

Below, a method of deriving these values will be described.

First, assuming conductance viewed from the antenna 21 as G (for example, 1/50 {1/Ω}), in FIG. 3 (A), impedance matching is taken when a condition of formula (3), i.e., formula (6) holds for admittance $Y_{in1}$ at the frequency $f_{01}$ viewed from the antenna 21.

Further, in FIG. 3 (B), impedance matching is taken when a condition of formula (4), i.e., formula (7) holds for admittance $Y_{in2}$ at the frequency $f_{02}$ viewed from the antenna 21. There, Re[ ] denotes a real part of the inside of the bracket, and Im[ ] denotes an imaginary part of the inside of the bracket.

$$Y_{in1}|_{\omega=\omega_{01}} = \frac{1}{\frac{1}{j\omega_{01}C^{m}_{in1}} + \frac{1}{jB^{m}_{r11} + \frac{1}{\frac{1}{j\omega_{01}C_{g1}} + \frac{1}{jB_{r12} + \frac{1}{j\omega_{01}C_{out1}} + \frac{1}{G} +}}}} + j\omega_{01}C^{m}_{in2} = G \quad (3)$$

-continued $$Y_{in2}|_{\omega=\omega_{02}} = \frac{1}{\frac{1}{j\omega_{02}C\omega^m_{in2}} + \frac{1}{jB^m_{r21} + \frac{1}{\frac{1}{j\omega_{02}C_{g2}} + \frac{1}{jB_{r22} + \frac{1}{j\omega_{02}C_{out2}} + \frac{1}{G}}}}} + j\omega_{02}C\omega^m_{in1} = G \quad (4)$$

$$\omega_{01} = 2\pi f_{01},\ \omega_{02} = 2\pi f_{02} \quad (5)$$

$$\mathrm{Re}[Y_{in1}]|_{\omega=\omega_{01}} = G,\ \mathrm{Im}[Y_{in1}]|_{\omega=\omega_{01}} = 0 \quad (6)$$

$$\mathrm{Re}[Y_{in2}]|_{\omega=\omega_{02}} = G,\ \mathrm{Im}[Y_{in2}]|_{\omega=\omega_{02}} = 0 \quad (7)$$

Figure 4:
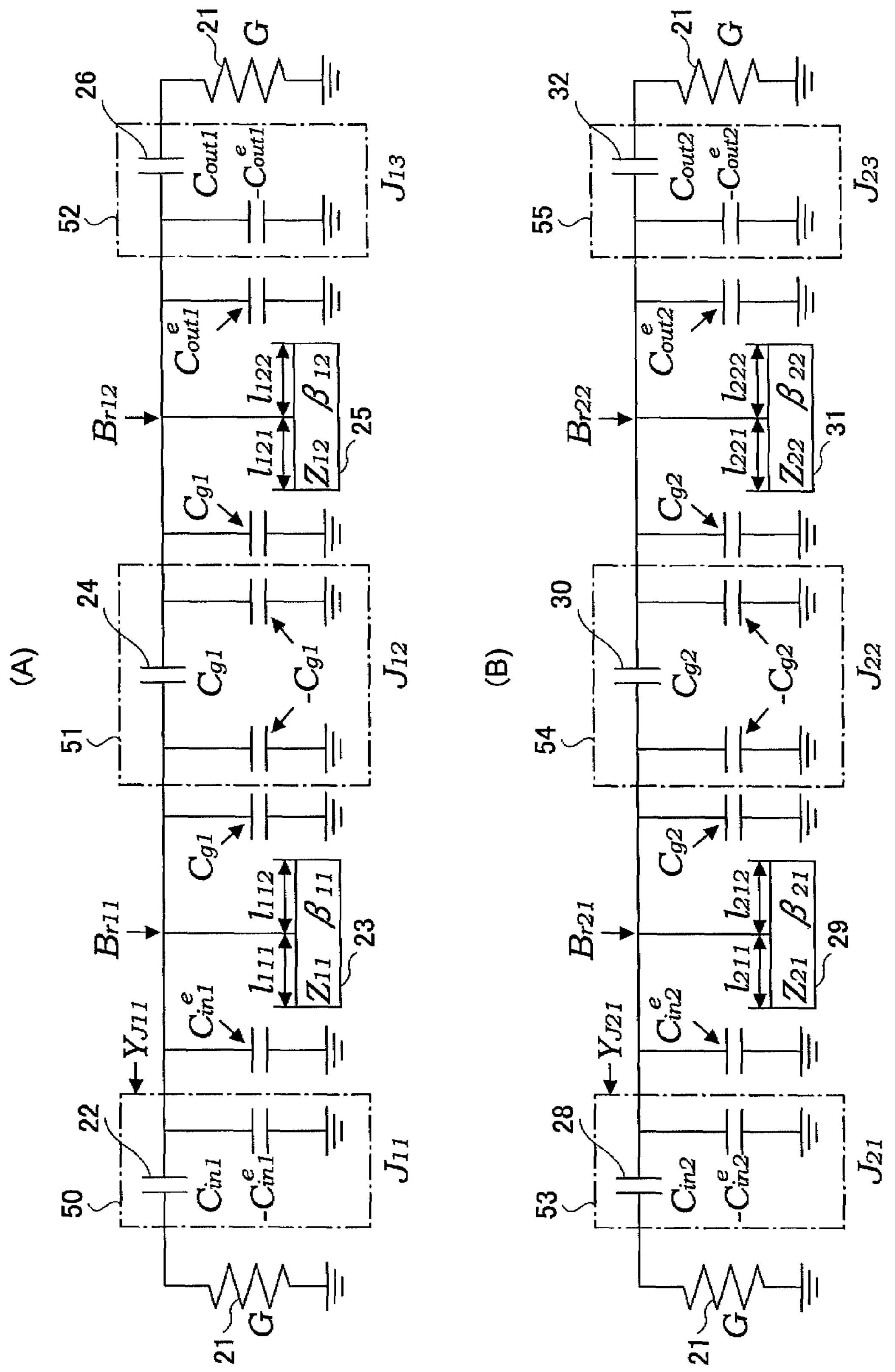
FIG. 4 shows an equivalent circuit using admittance inverters of a transmission side bandpass filter and a reception side bandpass filter having ideal characteristics.
Figure 5:
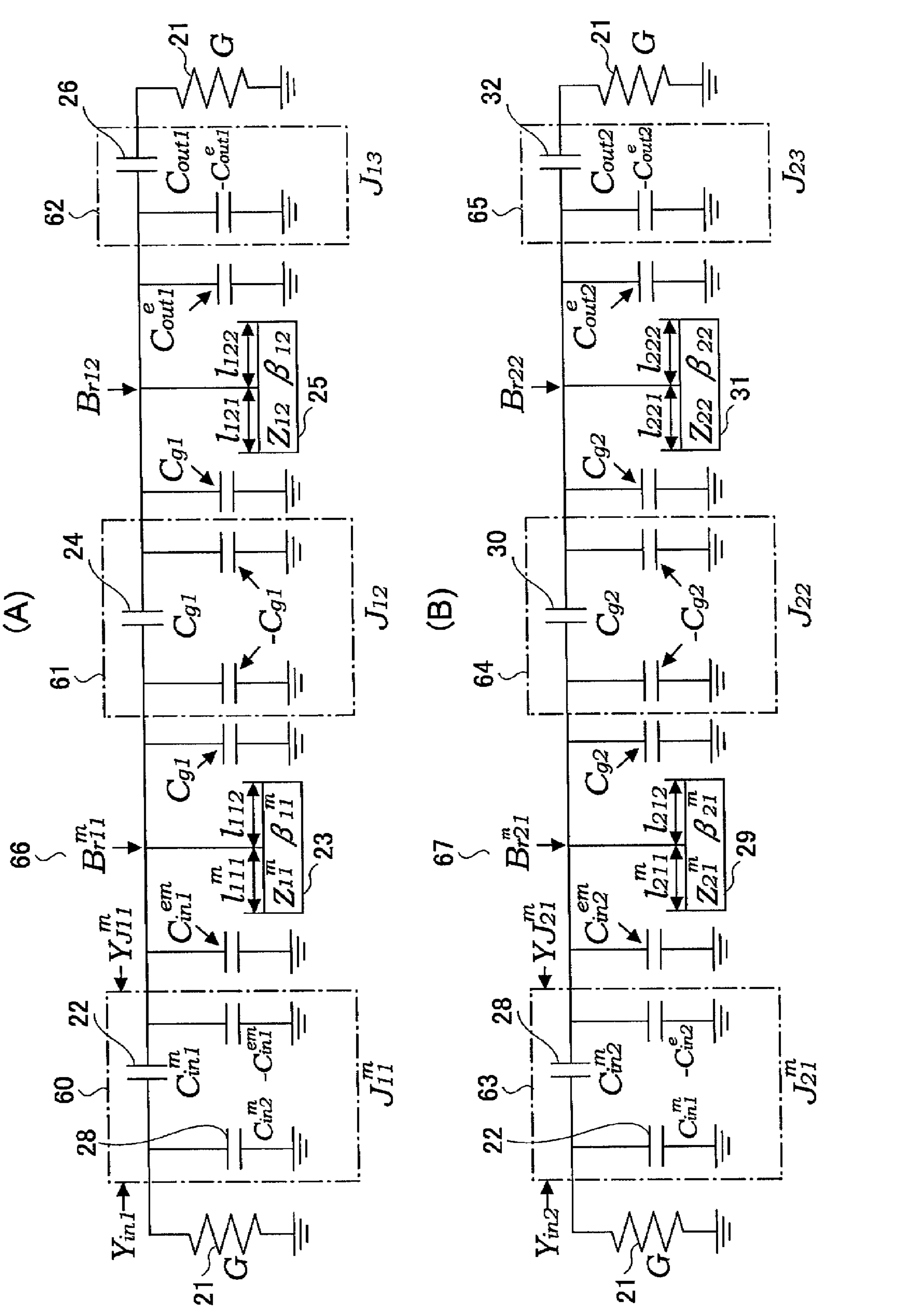
FIG. 5 shows an equivalent circuit using admittance inverters in the equivalent circuit of FIG. 3 (A), (B).

As to the transmission side bandpass filter 400 and the reception side bandpass filter 600, in a case where impedance matching is taken alone with the use of the entirety of the respective values of the capacitors 22, 24, 26, 28, 30, 32 and the resonators 23, 25, 29, 31, an equivalent circuit (see FIG. 4 (A), (B)) using admittance inverters of the transmission side bandpass filter 400 and the reception side bandpass filter 600 is compared at the center frequencies with an equivalent circuit (see FIG. 5 (A), (B)) using admittance inverters for FIG. 3 (A), (B). Then, input admittances $Y_{11}$, $Y_{21}$ of admittance inverters $J_{11}$, $J_{21}$ of the former should agree with input admittances $Y^m_{J11}$, $J^m_{J21}$ of admittance inverters $J^m_{11}$, $J^m_{21}$ of the latter, respectively.

In more detail, in FIG. 4 (A), (B), the input capacitor 22 has capacitance $C_{in1}$, and the tap coupling type resonator 23 has a length of a stub of one side thereof as $l_{111}$, characteristic impedance as $Z_{11}$, and phase constant as $\beta_{11}$, the input capacitor 28 has capacitance $C_{in2}$, and the tap coupling type resonator 29 has a length of a stub of one side thereof as $l_{211}$, characteristic impedance as $Z_{21}$, and phase constant as $\beta_{21}$. In contrast thereto, in FIG. 5 (A), (B), the input capacitor 22 has capacitance $C^m_{in1}$, and the tap coupling type resonator 23 has a length of a stub of one side thereof as $l^m_{111}$, characteristic impedance as $Z^m_{11}$, and phase constant as $\beta^m_{11}$, the input capacitor 28 has capacitance $C^m_{in2}$, and the tap coupling type resonator 29 has a length of stub of one side thereof as $l^m_{211}$, characteristic impedance as $Z^m_{21}$, and phase constant as $\beta^m_{21}$. Thereamong, the phase constants $\beta^m_{11}$, $\beta^m_{21}$ are determined by line structures of the resonators 23, 29, and material constant of materials used, and therefor, it is assumed that $\beta_{11}=\beta^m_{11}$, $\beta_{21}=\beta^m_{21}$.

In FIG. 4 (A), (B), in order to generate admittance inverters 50, 51, 52 ($J_{11}$, $J_{12}$, $J_{13}$), positive and negative capacitances $C^e_{in1}$ and $-C^e_{in1}$, $C_{g1}$ and $-C_{g1}$, $C^e_{out1}$ and $-C^e_{out1}$, corresponding to first and second virtual coupling devices, are introduced. In order to generate admittance inverters 53, 54, 55 ($J_{21}$, $J_{22}$, $J_{23}$), positive and negative capacitances $C^e_{in2}$ and $-C^e_{in2}$, $C_{g2}$ and $-C_{g2}$, $C^e_{out2}$ and $-C^e_{out2}$, corresponding to first and second virtual coupling devices are introduced.

In FIG. 5 (A), (B), in order to generate admittance inverters 60, 61, 62 ($J^m_{11}$, $J_{12}$, $J_{13}$), positive and negative capacitances $C^{em}_{in1}$ and $-C^{em}_{in1}$, $C_{g1}$ and $-C_{g1}$, $C^e_{out1}$ and $-C^e_{out1}$, corresponding to first and second virtual coupling devices, are introduced. In order to generate admittance inverters 63, 64, 65 ($J^m_{21}$, $J_{22}$, $J_{23}$), positive and negative capacitances $C^{em}_{in2}$ and $-C^{em}_{in2}$, $C_{g2}$ and $-C_{g2}$, $C^e_{out2}$ and $-C^e_{out2}$, corresponding to first and second virtual coupling devices, are introduced.

Relational expression of the capacitances $C_{in1}$, $C_{in2}$, $-C^e_{in1}$, $-C^e_{in2}$, the admittance inverters $J_{11}$, $J_{21}$ and the input admittances $Y_{J11}$. $Y_{J21}$ of the admittance inverters $J_{11}$, $J_{21}$ in FIG. 4 (A), (B) can be expressed by formulas (8) through (13), respectively, in general. It is noted that $w_{01}$, $w_{02}$ defined by the formula (12) and used in the formula (10) denote band widths.

$$C_{in1} = \frac{J_{11}}{\omega_{01}\sqrt{1-\left(\frac{J_{11}}{G}\right)^2}},\ C_{in2} = \frac{J_{21}}{\omega_{02}\sqrt{1-\left(\frac{J_{21}}{G}\right)^2}} \quad (8)$$

$$-C^e_{in1} = -\frac{J_{11}}{\omega_{01}}\sqrt{1-\left(\frac{J_{11}}{G}\right)^2},\ -C^e_{in2} = -\frac{J_{21}}{\omega_{02}}\sqrt{1-\left(\frac{J_{21}}{G}\right)^2} \quad (9)$$

$$J_{11} = \sqrt{\frac{\omega_{01}C_{r1}G\omega_{01}}{g_0 g_1 \omega_{c0}}},\ J_{21} = \sqrt{\frac{\omega_{02}C_{r2}G\omega_{02}}{g_0 g_1 \omega_{c0}}} \quad (10)$$

$$\omega_{01} = \frac{\Delta f_{01}}{f_{01}},\ \omega_{02} = \frac{\Delta f_{02}}{f_{02}} \quad (11)$$

$$Y_{J11} = \frac{\omega_{01}^2 C_{in1}^2 G}{G^2 + \omega_{01}^2 C_{in1}^2} + j\frac{\omega_{01}(C_{in1} - C^e_{in1})G^2 - \omega_{01}^3 C_{in1}^2 C^e_{in1}}{G^2 + \omega_{01}^2 C_{in1}^2} \quad (12)$$

$$Y_{J21} = \frac{\omega_{02}^2 C_{in2}^2 G}{G^2 + \omega_{02}^2 C_{in2}^2} + j\frac{\omega_{02}(C_{in2} - C^e_{in2})G^2 - \omega_{02}^3 C_{in2}^2 C^e_{in2}}{G^2 + \omega_{02}^2 C_{in2}^2} \quad (13)$$

Further, the input admittances $Y^m_{J11}$. $Y^m_{J21}$ of the admittance inverters $J^m_{11}$, $J^m_{21}$ in FIG. 5 (A), (B) can be expressed by formulas (14) and (15), respectively.

In order to make the equivalent circuits of the antenna duplexers shown in FIG. 5 (A), (B) equivalent to the equivalent circuits of the ideal bandpass filters shown in FIG. 4 (A), (B) at the central frequencies at the center angular frequencies, formula (16) should holds. Therefore, by substituting the formulas (12) through (15) into (16), formulas (17), (18) which are relation expressions for the capacitors $-C^{em}_{in1}$ and $-C^{em}_{in2}$ can be obtained. As a result, it can be confirmed that $J^m_{11}$ and $J^m_{21}$ operate as admittance inverters.

$$Y^m_{J11} = -j\omega_{01}C^{em}_{in1} + \frac{1}{\frac{1}{j\omega_{01}C^m_{in1}} + \frac{1}{j\omega_{01}C^m_{in2} + G}} \quad (14)$$

$$Y^m_{J21} = -j\omega_{02}C^{em}_{in2} + \frac{1}{\frac{1}{j\omega_{02}C^m_{in2}} + \frac{1}{j\omega_{02}C^m_{in1} + G}} \quad (15)$$

$$\left.\begin{array}{l} \mathrm{Re}[Y_{J11}] = \mathrm{Re}[Y^m_{J11}],\quad \mathrm{Im}[Y_{J11}] = \mathrm{Im}[Y^m_{J11}] \\ \mathrm{Re}[Y_{J21}] = \mathrm{Re}[Y^m_{J21}],\quad \mathrm{Im}[Y_{J21}] = \mathrm{Im}[Y^m_{J21}] \end{array}\right\} \quad (16)$$

-continued $$-C_{in1}^{em} = \frac{G^2\omega_{01}C_{in1} - \omega_{01}C_{in1}^{e}(G^2 + \omega_{01}^2 C_{in1}^2)}{\omega_{01}G^2 + \omega_{01}^3 C_{in1}^2} - \frac{\omega_{01}C_{in1}^{m}\{G^2 + \omega_{01}^2 C_{in2}^{m}(C_{in1}^{m} + C_{in2}^{m})\}}{\omega_{01}G^2 + \omega_{01}^3 (C_{in1}^{m} + C_{in2}^{m})^2} \tag{17}$$

$$-C_{in2}^{em} = \frac{G^2\omega_{02}C_{in2} - \omega_{02}C_{in2}^{e}(G^2 + \omega_{02}^2 C_{in2}^2)}{\omega_{02}G^2 + \omega_{02}^3 C_{in2}^2} - \frac{\omega_{02}C_{in2}^{m}\{G^2 + \omega_{02}^2 C_{in1}^{m}(C_{in2}^{m} + C_{in1}^{m})\}}{\omega_{02}G^2 + \omega_{02}^3 (C_{in2}^{m} + C_{in1}^{m})^2} \tag{18}$$

Figure 6:
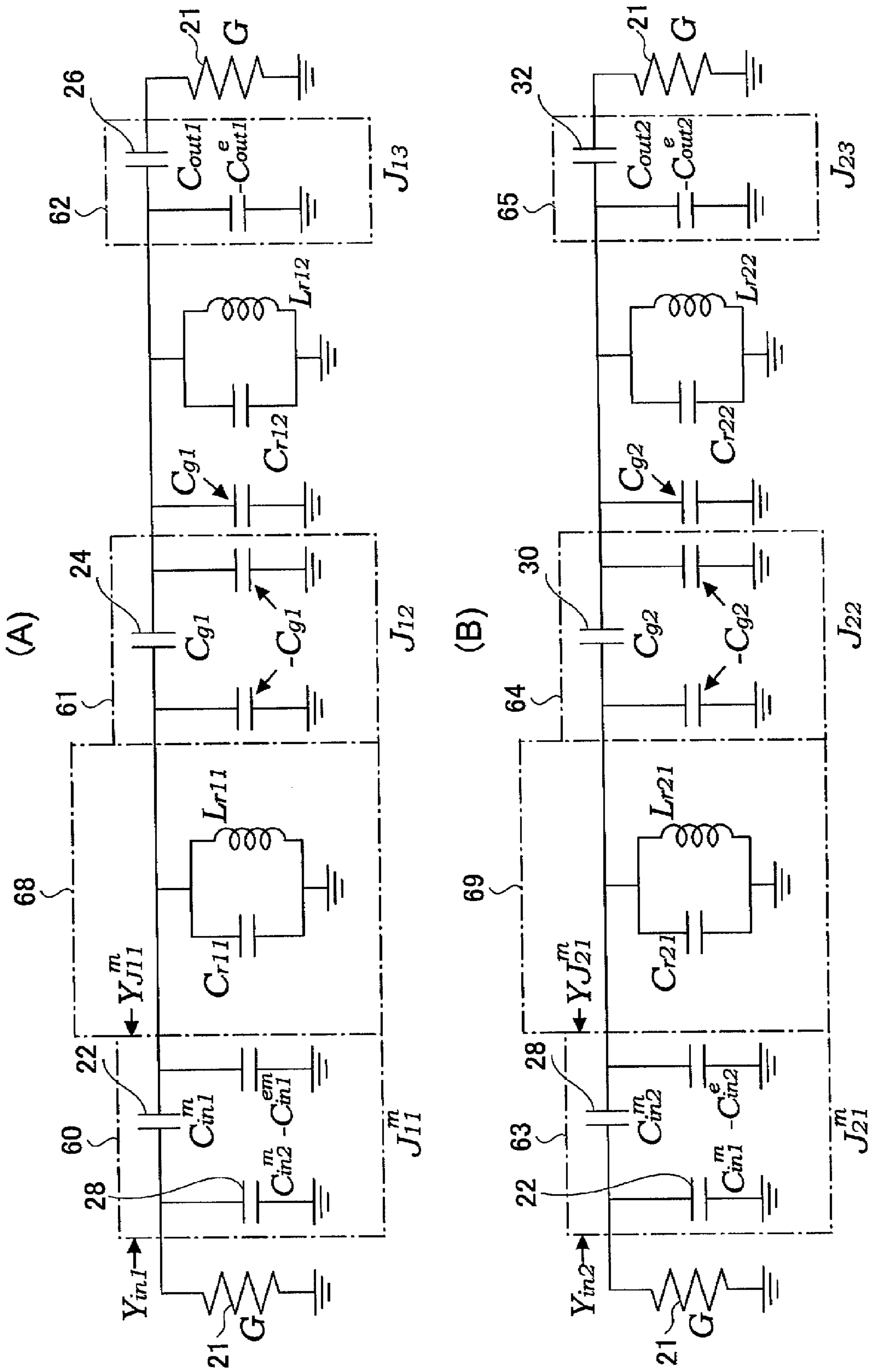
FIG. 6 shows an equivalent circuit using admittance inverters for illustrating the present invention.

Next, since resonator system 66 and 67 in a first stage in FIG. 5 (A), (B) should meet resonance conditions, admittance inverters, resonance conditions and susceptance slope parameters are obtained. In FIG. 5 (A), (B), assuming that respective input susceptances of the resonators 23, 29 are $B^m_{r11}$, $B^m_{r21}$, input susceptance $B^m_{in11}$ of the resonator system 66 including the capacitances $C^{em}_{in1}$ and $C_{g1}$ of the resonator 23 at $f=f_{01}(\omega=\omega_{01}$, and input susceptance $B^m_{in21}$ of the resonator system 67 including the capacitances $C^{em}_{in2}$ and $C_{g2}$ of the resonator 29 at $f=f_{02}(\omega=\omega_{02})$, are expressed by formulas (19) and (20). Further, in order that the resonators 23, 29 using the distributed constant lines in the circuits of FIG. 5 (A), (B) can be replaced by lumped constant type LC parallel resonators 68, 69 including inductive devices $L_{r11}$, $L_{r21}$ and capacitive devices $C_{r11}$, $C_{r21}$ such as those shown in FIG. 6 (A), (B), susceptance slope parameters $b^m_{11}$, $b^m_{21}$ defined by formulas (21), (22) should agree with respective susceptance slope parameters $\omega_{01}C_{r11}$, $\omega_{02}C_{r21}$ of the lumped constant type LC parallel resonators 68, 69 at $\omega=\omega_{01}$, $\omega=\omega_{02}$. Therefore, formulas (23), (24) should be met.

$$\begin{aligned} B_{in11}^{m}|_{\omega=\omega_{01}} &= B_{r11}^{m} + \omega_{01}(C_{in1}^{em} + C_{g1}) \\ &= \frac{\tan\beta_{11}^{m} l_{111}^{m} + \tan\beta_{11}^{m} l_{112}^{m}}{Z_{11}^{m}} + \omega_{01}(C_{in1}^{em} + C_{g1}) \\ &= 0 \end{aligned} \tag{19}$$

$$\begin{aligned} B_{in21}^{m}|_{\omega=\omega_{02}} &= B_{r21}^{m} + \omega_{02}(C_{in2}^{em} + C_{g2}) \\ &= \frac{\tan\beta_{21}^{m} l_{211}^{m} + \tan\beta_{21}^{m} l_{212}^{m}}{Z_{21}^{m}} + \omega_{02}(C_{in2}^{em} + C_{g2}) \\ &= 0 \end{aligned} \tag{20}$$

$$b_{11}^{m} = \frac{\omega_{01}}{2}\frac{dB_{in11}^{m}}{d\omega}\bigg|_{\omega=\omega_{01}} \tag{21}$$

$$b_{21}^{m} = \frac{\omega_{02}}{2}\frac{dB_{in21}^{m}}{d\omega}\bigg|_{\omega=\omega_{02}} \tag{22}$$

$$b_{11}^{m} = \frac{\omega_{01}}{2}\frac{db_{in21}^{m}}{d\omega}\bigg|_{\omega=\omega_{01}} - \omega_{01}C_{r11} = 0 \tag{23}$$

$$b_{21}^{m} = \frac{\omega_{02}}{2}\frac{db_{in21}^{m}}{d\omega}\bigg|_{\omega=\omega_{02}} - \omega_{02}C_{r21} = 0 \tag{24}$$

Thus, the ideal transmission side bandpass filter and reception side bandpass filter shown in FIG. 4 (A), (B) are designed separately, the respective device constants of the capacitors 22, 24, 26, 28, 30, 32 and the resonators 23, 25, 29, 31 are determined, and after that, the capacitances $C^{em}_{in1}$, $C^{em}_{in2}$ of the input capacitors 22, 28, the lengths $l^m_{in1}$, $l^m_{211}$ of the stubs of one side and the characteristic impedances $Z^m_{11}$ and $Z^m_{21}$ of the resonators 23, 29 in the first stage shown in FIGS. 3 (A), (B) and FIG. 5 (A), (B) are calculated with the use of the formulas (3), (4), (17) through (20), (23), (24). Thus, the respective device constants of the capacitors 22, 24, 26, 28, 30, 32 and the resonators 23, 25, 29, 31 can be determined easily in a short time.

That is, for the capacitors 24, 26, 30, 32 in the second stage and subsequent thereto and the resonators 25, 31 in the second stage and subsequent thereto viewed from the antenna 21, the device constants are identical to the ideal transmission side bandpass filter and reception side bandpass filter, and, in consideration of increasing the number of stages of resonators, it is very efficient.

Figure 7:
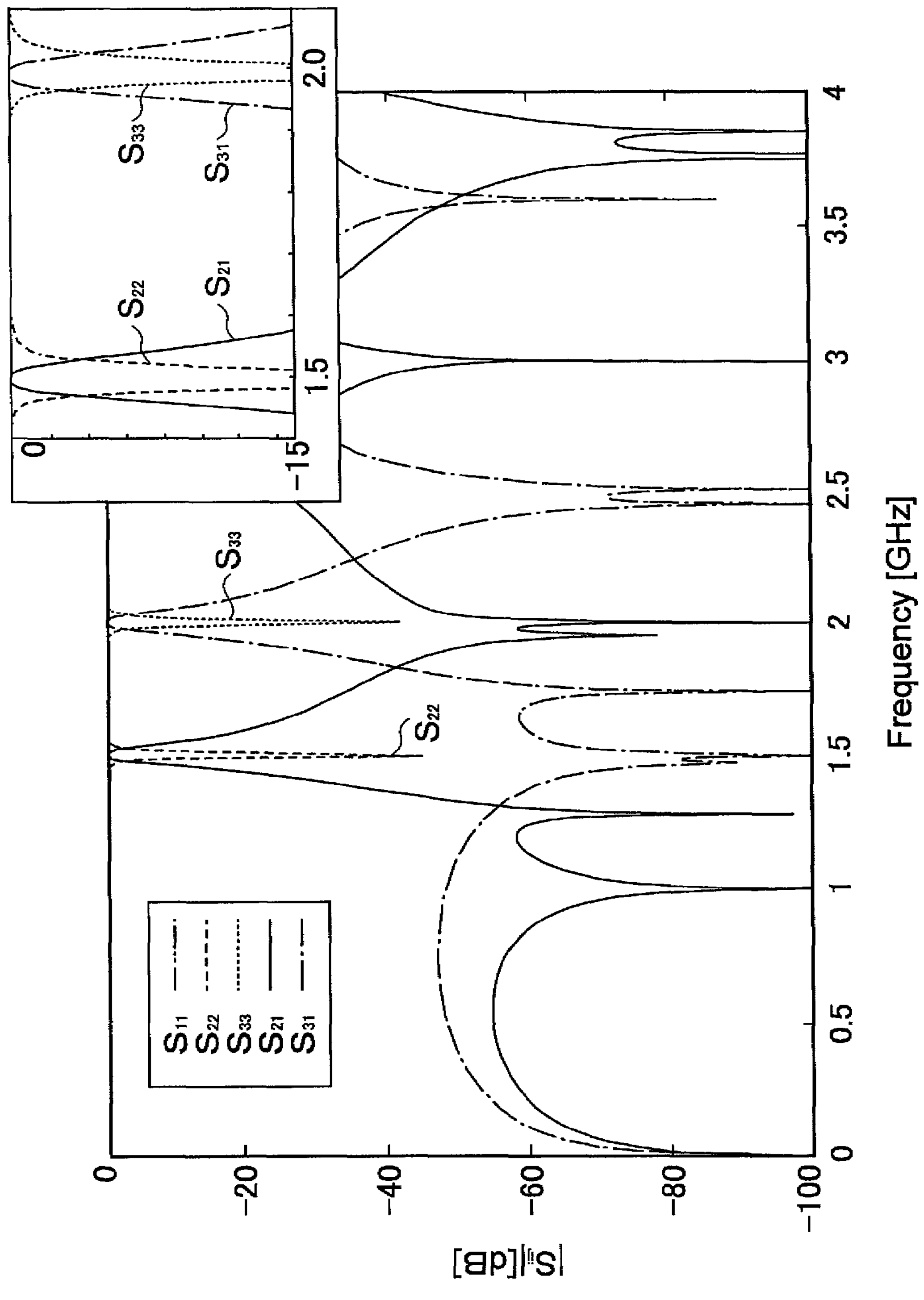
FIG. 7 shows reflection and transmission characteristics in FIG. 3.
Figure 8:
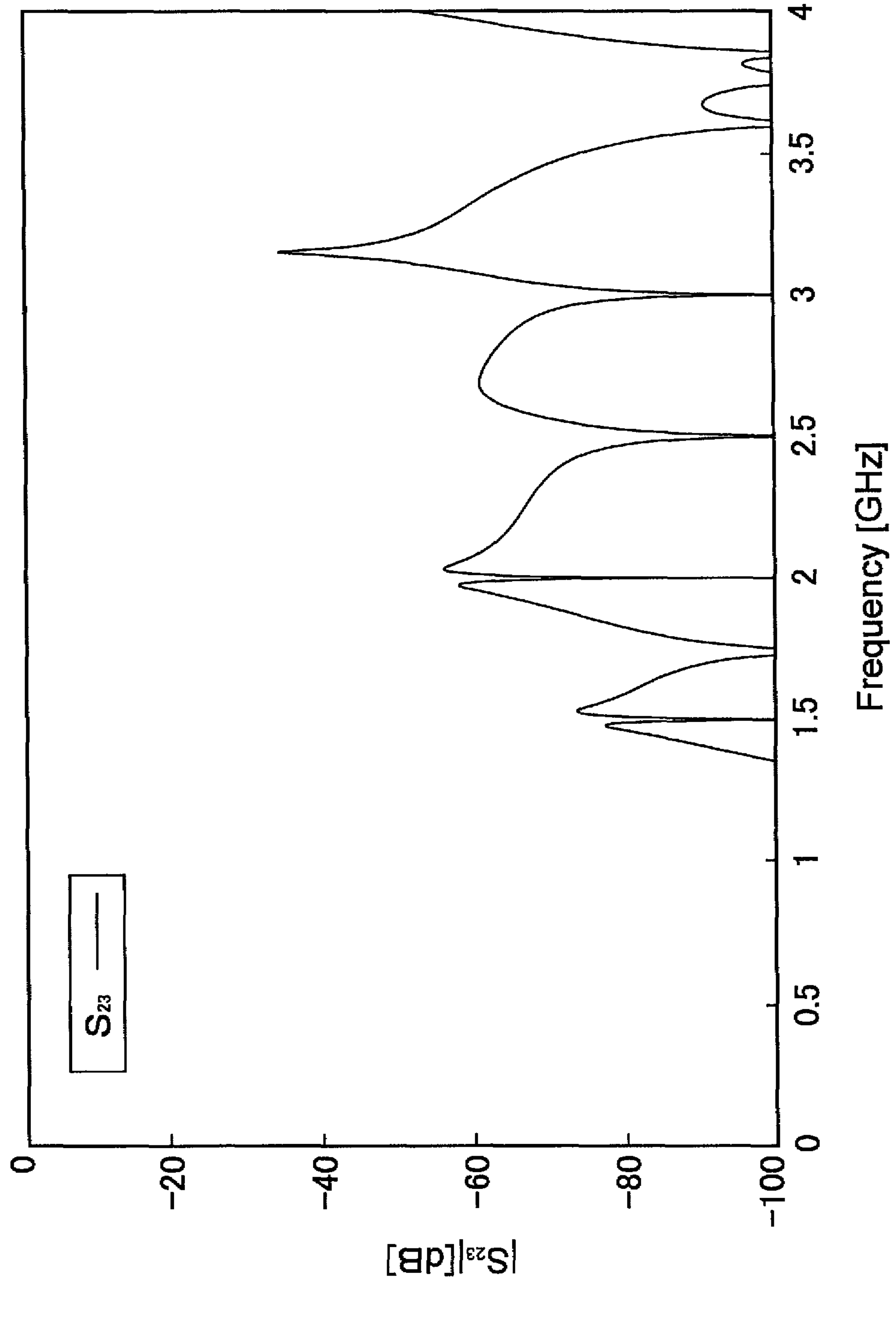
FIG. 8 shows isolation characteristics in FIG. 3.

FIG. 7 shows reflection and transmission characteristics in FIG. 3, and FIG. 8 shows isolation characteristics. It is noted that $S_{11}$ denote a reflection coefficient in the antenna 21, $S_{22}$ denotes a reflection coefficient in the transmission port 27 of the transmission side bandpass filter, $S_{21}$ denotes a transmission coefficient from the antenna 21 to the transmission port 27 of the transmission side bandpass filter, $S_{33}$ denotes a reflection coefficient in the reception port 33 of the reception side bandpass filter, and $S_{31}$ denotes a transmission coefficient from the antenna 21 to the reception port 33 of the transmission side bandpass filter. In FIG. 7, the reflection coefficient $S_{11}$ falls on the reflection coefficient $S_{22}$ and the reflection coefficient $S_{33}$.

It is noted that attenuation poles cannot be created on a high band side and a low band side of a passing band in a non-loaded type λ/2 resonator such as the resonator 23. However, attenuation poles can be created on a high band side and a low band side of a passing band in a non-loaded type λ/4 resonator.

Figure 9:
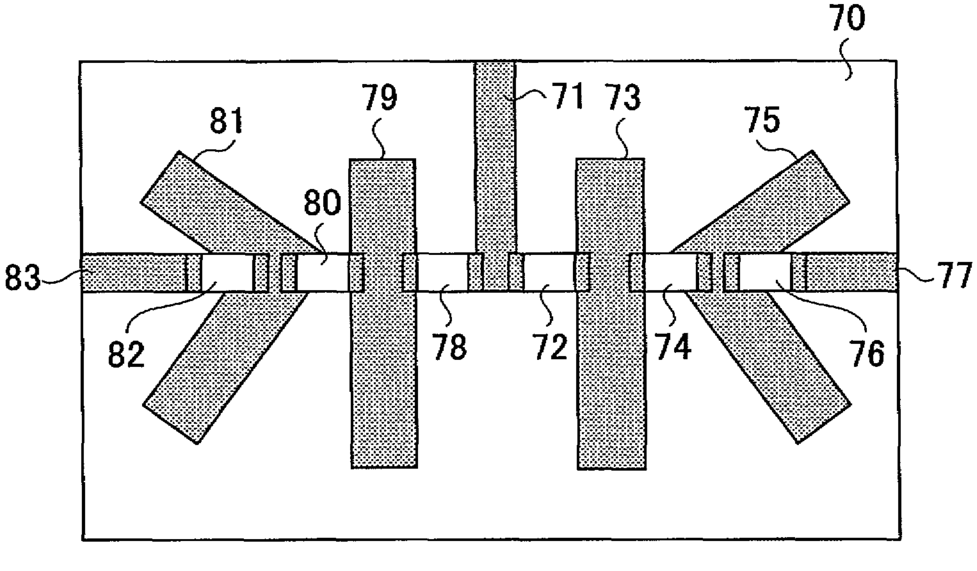
FIG. 9 shows a plan configuration of a duplexer which is a first embodiment of a multiplexing circuit of the present invention.

FIG. 9 shows a plan configuration view of a duplexer in a first embodiment of a multiplexing circuit in the present invention. In FIG. 9, a lower conductor is provided on a bottom surface of a dielectric substrate 70 as an input terminal. To one end of a micro strip line 71, an external antenna 21 is connected. To the other end of the micro strip line 71, one ends of capacitors 72, 78 as coupling devices are connected.

The other end of the capacitor 72 is tap-connected to a center part of a micro strip line 73 as a resonator 23. To the center part of the micro strip line 73, one end of the capacitor 74 as a coupling device is tap-connected. To the other end of the capacitor 74, a center part of a micro strip line 75 as a resonator 25 is tap-connected. To the center part of the micro strip line 75, one end of a capacitor 76 as a coupling device is connected. To the other end of the capacitor 76, one end of a micro strip line 77 as a transmission port 27 is connected. The above-mentioned capacitors 72, 74, 76 and the micro strip lines 71, 73, 75, 77 configure a first bandpass filter.

The other end of the capacitor 78 is tap-connected to a center part of a micro strip line 79 as a resonator 29. To the center part of the micro strip line 79, one end of a capacitor 80 as a coupling device is tap-connected. To the other end of the capacitor 80, a center part of the micro strip line 81 as a resonator 31 is tap-connected. To the micro strip line 81, one end of a capacitor 82 as a coupling device is connected. To the other end of the capacitor 82, one end of a micro strip line 83 as a reception port 33 is connected. The above-mentioned capacitors 78, 80, 82 and the micro strip lines 71, 79, 81, 83 configure a second bandpass filter.

It is noted that, although the capacitors 22, 24, 26, 28, 30 and 32 are used in the present embodiment, inductors may be used, or the capacitors and the inductors may be used in a combined manner.

Figure 10:
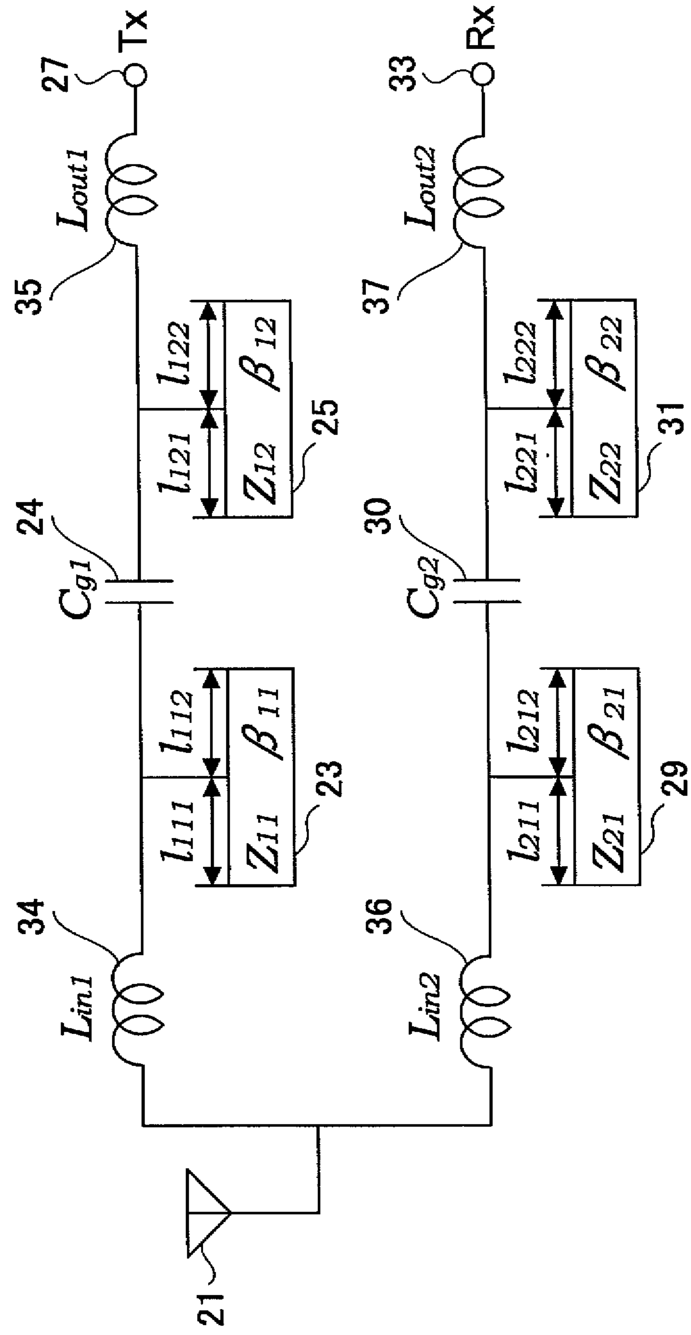
FIG. 10 shows a circuit configuration of an antenna duplexer.
Figure 11:
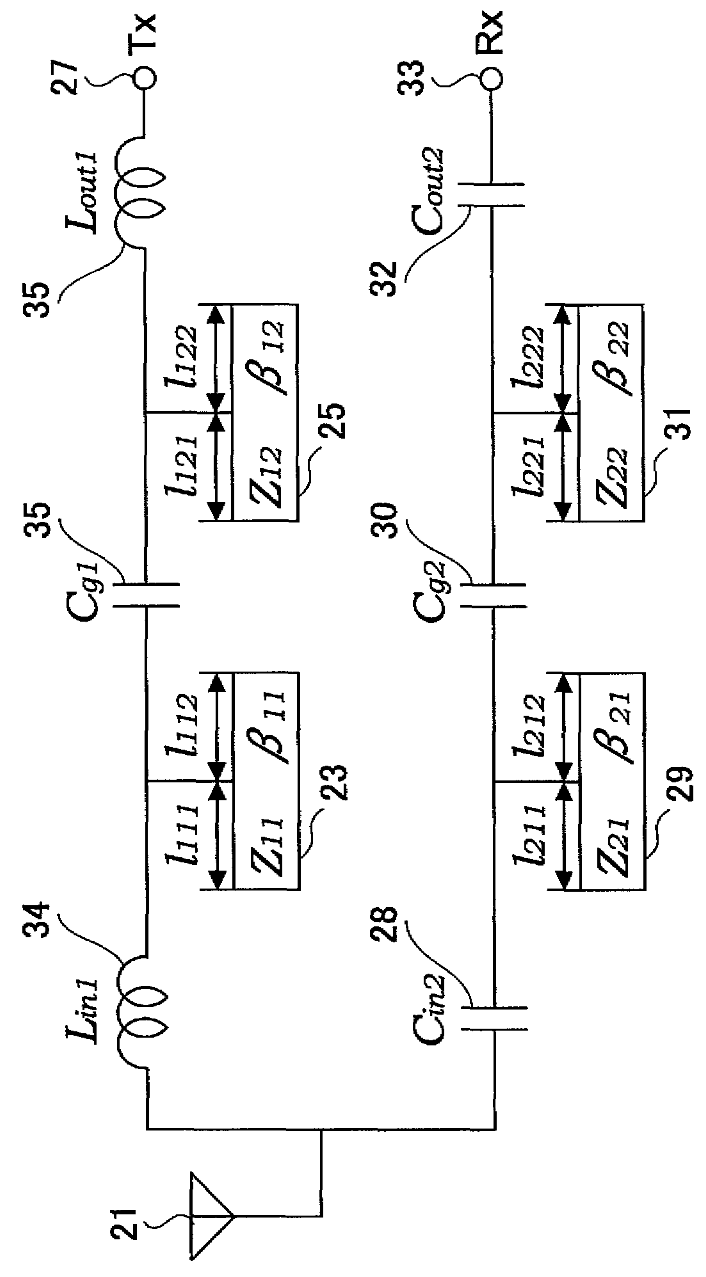
FIG. 11 shows a circuit configuration of an antenna duplexer.

Below, a circuit configuration example will be shown. FIG. 10 shows a circuit configuration of an antenna duplexer using inductors 34, 35, 36, 37 and capacitors 24, 30 as coupling devices, and tap-coupling-type resonators 23, 25, 29, 31 are used as resonance circuits. FIG. 11 shows a circuit configuration of an antenna duplexer using inductors 34, 35 and capacitors 24, 28, 30, 32 as coupling devices, and tap-coupling-type resonators 23, 25, 29, 31 are used as resonance circuits.

Figure 12:
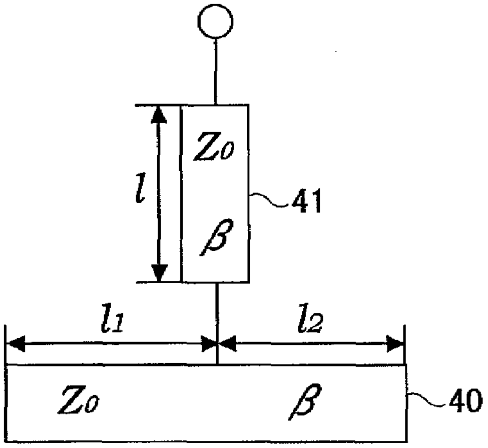
FIG. 12 shows a circuit configuration of a resonance circuit.
Figure 12:
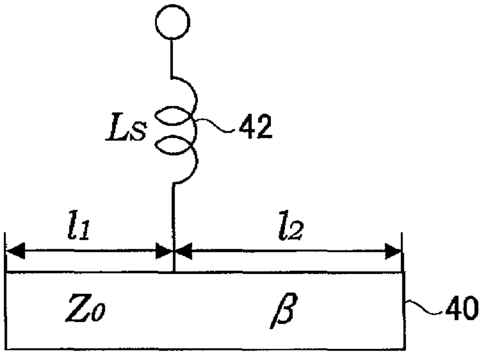
Figure 12:
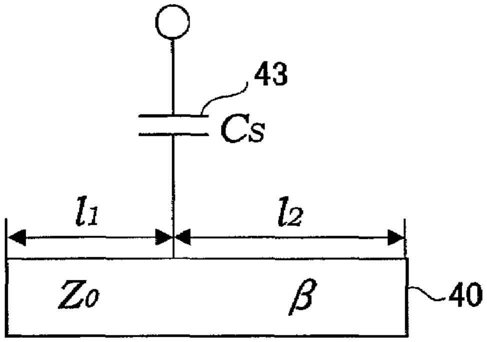
Figure 12:
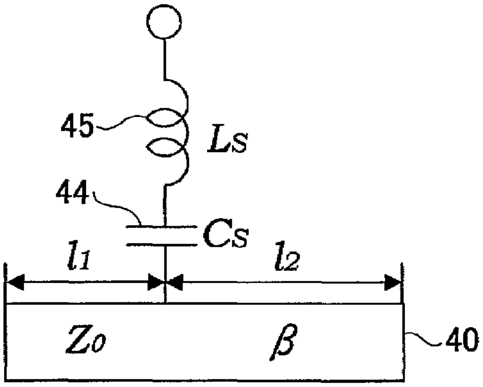
Figure 12:
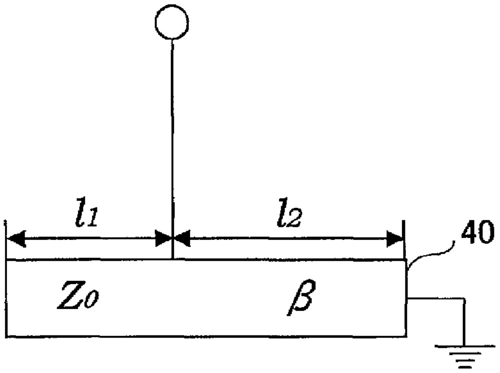

Further, although the resonance circuits are configured only by the resonators 23, 25, 29 and 31 in the present embodiment, the resonance circuit may be configured as shown in FIG. 12 (A) by a resonator 40 tap-coupled to a coupling device and a distributed constant line 41 which is connected in series between the resonator 40 and the coupling device (distributed constant line loaded resonance circuit). Further, as shown in FIG. 12 (B) through (D), an inductor 42, a capacitor 43, or an inductor 45 and a capacitor 44 may be connected between the resonator 40 and the coupling device. Further, as shown in FIG. 12 (E), one end (or both ends) of the resonator 40 tap-coupled to the coupling device may be grounded.

When the resonance circuit shown in FIG. 12 (A) is used, attenuation poles can be created on a high band side and a low band side of a passing band whether the resonator 40 is of $\lambda/2$ or $\lambda/4$. When the resonance circuit shown in FIG. 12 (B) is used, an attenuation pole can be created on a high band side of a passing band whether the resonator 40 is of $\lambda/2$ or $\lambda/4$. When the resonance circuit shown in FIG. 12 (C) is used, an attenuation pole can be created on a low band side of a passing band whether the resonator 40 is of $\lambda/2$ or $\lambda/4$. When the resonance circuit shown in FIG. 12 (D) is used, attenuation poles can be created on a high band side and a low band side of a passing band whether the resonator 40 is of $\lambda/2$ or $\lambda/4$. When the resonance circuit shown in FIG. 12 (E) is used, only one attenuation pole can be created on a high band side or a low band side of a passing band whether the resonator 40 is of $\lambda/2$ or $\lambda/4$.

Figure 13:
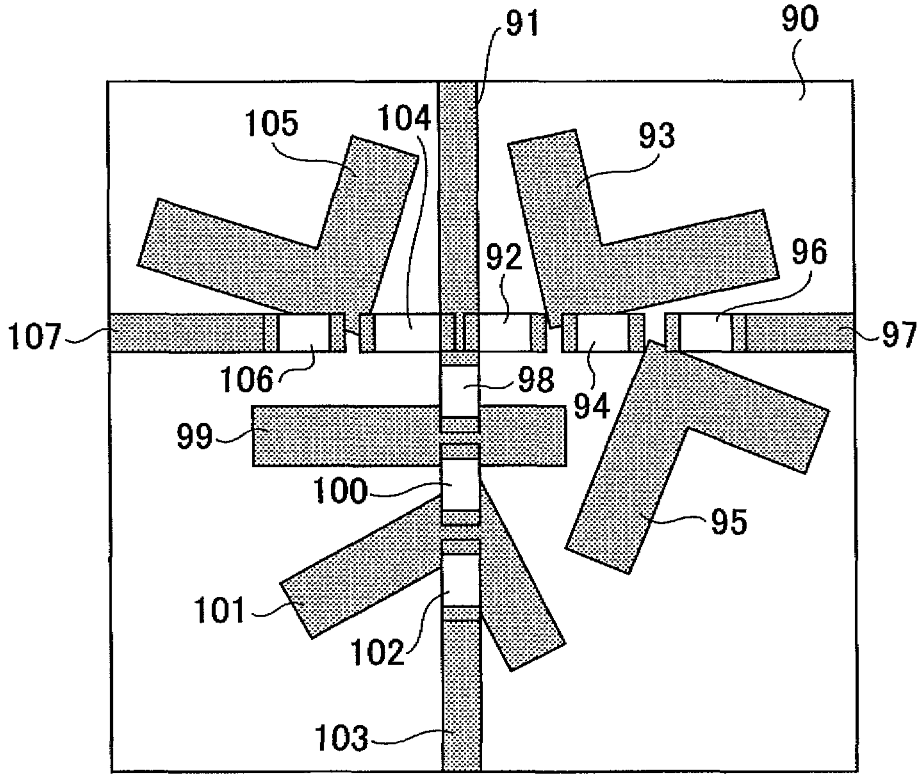
FIG. 13 shows a plan configuration of a triplexer which is a second embodiment of a multiplexing circuit in the present invention.

FIG. 13 shows a plan configuration of a triplexer in a second embodiment of a multiplexing circuit of the present invention. In FIG. 13, a lower conductor is provided on a bottom surface of a dielectric substrate 90 as an input terminal. To one end of a micro strip line 91, an external antenna 21 is connected for example. To the other end of the micro strip line 91, one ends of capacitors 92, 98, 104 are connected.

The other end of the capacitor 92 is tap-connected to a center part of a micro strip line 93 as a resonator. To the micro strip line 93, one end of a capacitor 94 as a coupling device is connected. To the other end of the capacitor 94, a center part of a micro strip line 95 as a resonator is tap-connected. To a micro strip line 95, one end of a capacitor 96 as a coupling device is connected. To the other end of the capacitor 96, one end of a micro strip line 97 as a first reception port is connected for example. The above-mentioned capacitors 92, 94, 96 and the micro strip lines 91, 93, 95, 97 configure a third bandpass filter.

The other end of the capacitor 98 is tap-connected to a center part of a micro strip line 99 as a resonator. To the micro strip line 99, one end of a capacitor 80 as a coupling device is connected. To the other end of the capacitor 80, a center part of a micro strip line 81 as a resonator is tap-connected. To the micro strip line 81, one end of a capacitor 82 as a coupling device is connected. To the other end of the capacitor 82, one end of a micro strip line 83 as a second reception port is connected for example. The above-mentioned capacitors 92, 94, 96 and the micro strip lines 91, 93, 95, 97 configure a fourth bandpass filter.

The other end of the capacitor 104 is tap-connected to a center part of a micro strip line 105 as a resonator. To the micro strip line 105, one end of a capacitor 106 as a coupling device is connected. To the other end of the capacitor 106, a center part of a micro strip line 107 as a third reception port is tap-connected for example. The above-mentioned capacitors 104, 106 and the micro strip lines 91, 105, 107 configure a fifth bandpass filter.

In the above-mentioned triplexer, frequency selection can be carried out on a signal received by the external antenna by the first through third bandpass filters respectively having mutually different passing bands, and, from the first through third reception ports, the signal can be output to a subsequent circuit, respectively.

It is noted that, although the lines are configured by the micro strip lines in the present embodiment, it is not necessary to limit thereto. Instead, it is also possible to configure with the use of coplanar lines, strip lines, coaxial lines, or such.

Figure 14:
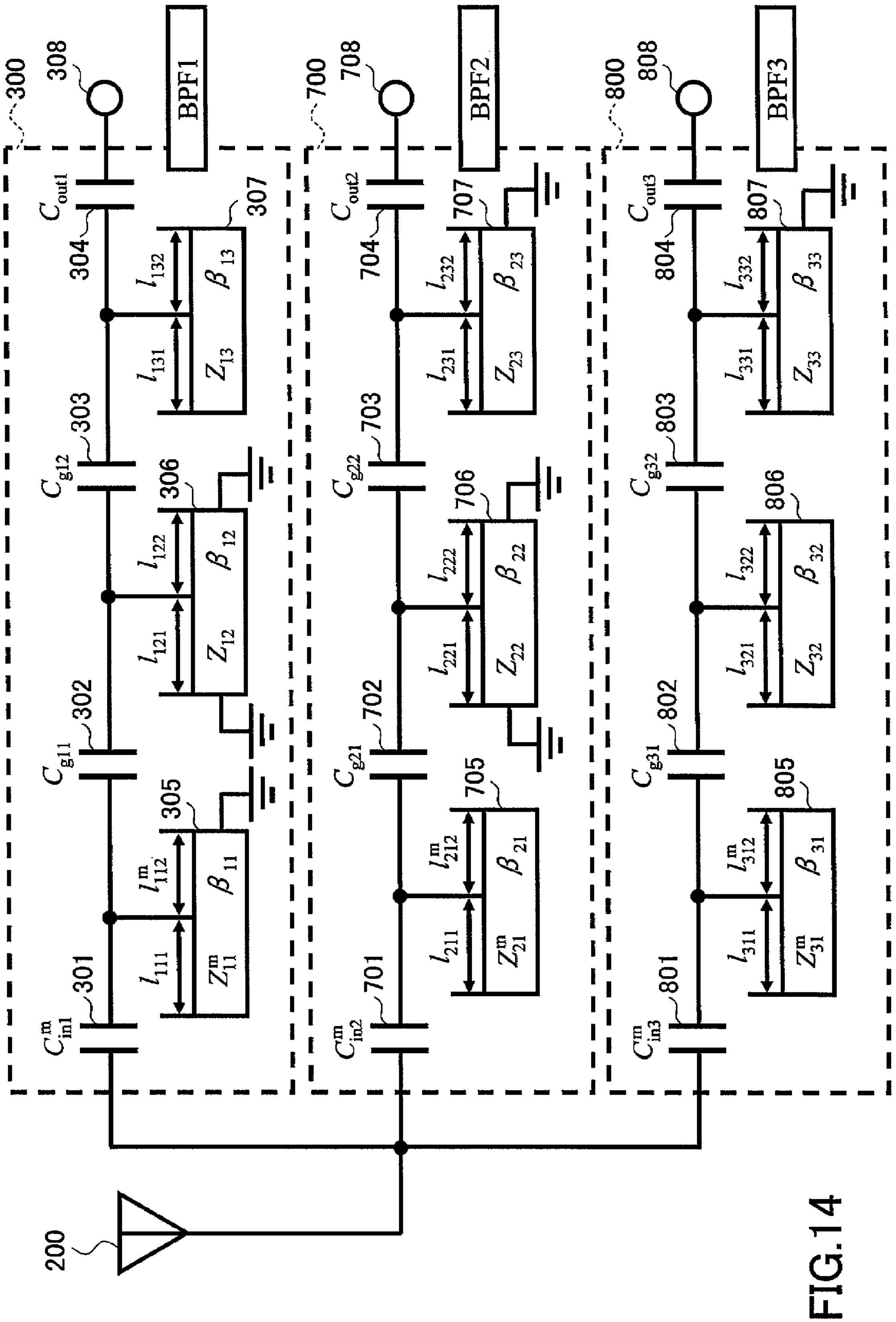
FIG. 14 shows a principle diagram of the triplexer which is the second embodiment of the multiplexing circuit in the present invention.

FIG. 14 shows a principle diagram of a triplexer in a third embodiment of a multiplexing circuit of the present invention. In FIG. 14, to an antenna 400, a transmission side bandpass filter 300 and reception side bandpass filters 700, 800 are directly connected without insertion of distributed constant lines for carrying out impedance matching.

The bandpass filter 300 is configured by capacitors 301 through 304 as coupling devices and resonators 305 through 307 as resonance circuits. The bandpass filter 700 is configured by capacitors 701 through 704 as coupling devices and resonators 705 through 707 as resonance circuits. The bandpass filter 800 is configured by capacitors 801 through 804 as coupling devices and resonators 805 through 807 as resonance circuits. A center frequency of the transmission side bandpass filter 300 is assumed as $f_{01}$. Center frequencies of the reception side bandpass filters 700, 800 are assumed as $f_{02}$ and $f_{03}$.

Below, a designing method for the antenna resonator in the present embodiment will be described. First, capacitances $C_{g11}$, $C_{g12}$, $C_{g21}$, $C_{g12}$, $C_{g11}$, $C_{g12}$ of the capacitors 302, 303, 702, 703, 802, 803, characteristic impedances $Z_{12}$, $Z_{23}$, $Z_{22}$, $Z_{23}$, $Z_{32}$, $Z_{33}$, phase constants $\beta_{12}$, $\beta_{23}$, $\beta_{22}$, $\beta_{23}$, $\beta_{32}$, $\beta_{33}$, and lengths $l_{121}$, $l_{122}$, $l_{131}$, $l_{132}$, $l_{221}$, $l_{222}$, $l_{231}$, $l_{232}$, $l_{321}$, $l_{322}$, $l_{331}$, $l_{332}$ of stubs of the resonators 306, 306, 706, 707, 806, 807, and lengths $l_{112}$, $l_{212}$, $l_{312}$ of stubs of the resonators 305, 705, 805 are designed in such a manner that desired filter characteristics are obtained for the transmission side bandpass filter 300 and the reception side bandpass filters 700, 800.

Next, in the center frequency $f_{01}$, design is carried out in such a manner that a contact point between the capacitor 701 and the resonator 705 and a contact point between the capacitor 801 and the resonator 805 are in a grounded state, and transmission signal components are prevented from leaking to reception ports. Design is carried out in such a manner that, in the center frequency $f_{02}$, a contact point between the capacitor 301 and the resonator 305 and a contact point between the capacitor 801 and the resonator 805 are in a grounded state, and in the center frequency $f_{03}$, a contact point between the capacitor 301 and the resonator 305 and a contact point between the capacitor 701 and the resonator 705 are in a grounded state, and reception signal components are prevented from leaking to a transmission port.

Capacitances $C^{m}{}_{in1}$, $C^{m}{}_{in2}$, $C^{m}{}_{in3}$, characteristic impedances $Z^{m}{}_{11}$, $Z^{m}{}_{21}$, $Z^{m}{}_{31}$, phase constants $\beta^{m}{}_{11}$, $\beta^{m}{}_{21}$, $\beta^{m}{}_{31}$, and lengths $l^{m}{}_{111}$, $l^{m}{}_{112}$, $l^{m}{}_{211}$, $l^{m}{}_{212}$, $l^{m}{}_{311}$, $l_{312}$, of stubs of the capacitors 301, 701, 801 and the resonators 305, 705, 805 are derived in such a manner that impedance matching is taken for the transmission side bandpass filter 300 and the reception side bandpass filters 700, 800.

Figure 15:
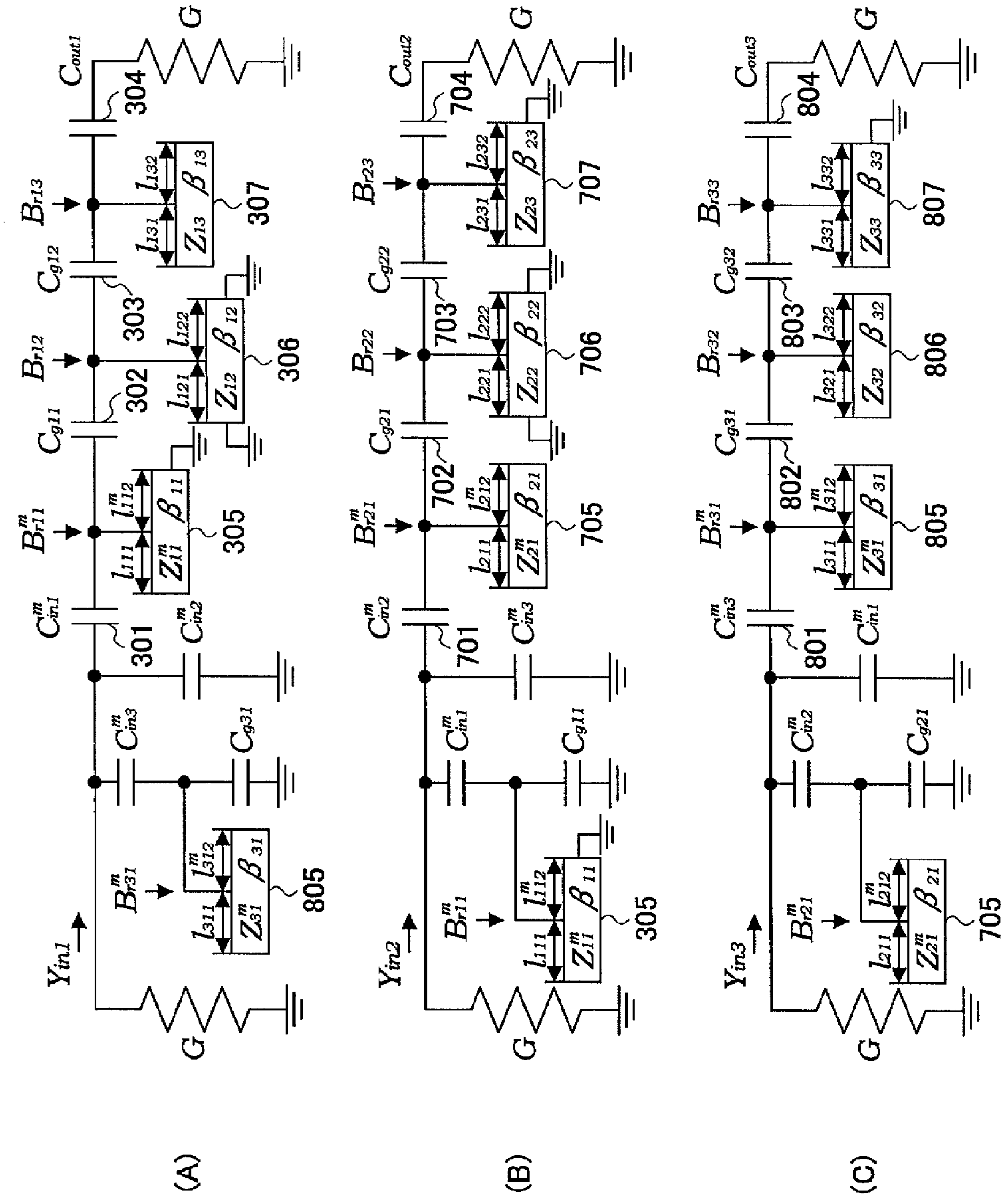
FIG. 15 shows an equivalent circuit at each center frequency.

Assuming that conductance of the antenna 200 is G, impedance matching is taken when a condition of formula (24), i.e., formula (25) holds for admittance $Y_{in1}$ at the frequency $f_{01}$ viewed from the antenna 200. FIG. 15(A) shows an equivalent circuit of the transmission side bandpass filter 300 at the frequency $f_{01}$.

Further, impedance matching is taken when a condition of formula (26), i.e., formula (27) holds for admittance $Y_{in2}$ at the frequency $f_{02}$ viewed from the antenna 200. FIG. 15(B) shows an equivalent circuit of the reception side bandpass filter 700 at the frequency $f_{02}$.

Impedance matching is taken when a condition of formula (28), i.e., formula (29) holds for admittance $Y_{in3}$ at the frequency $f_{03}$ viewed from the antenna 200. FIG. 15(C) shows an equivalent circuit of the reception side bandpass filter 800 at the frequency $f_{03}$. It is noted that, Re[ ] denotes a real part of the inside of the bracket, and Im[ ] denotes an imaginary part of the inside of the bracket.

$$Y_{in1}|_{\omega=\omega_{01}} = \cfrac{1}{\cfrac{1}{j\omega_{01}C^{m}_{in1}} + \cfrac{1}{jB^{m}_{r11} + \cfrac{1}{\cfrac{1}{j\omega_{01}C_{g11}} + \cfrac{1}{jB_{r12} + \cfrac{1}{\cfrac{1}{j\omega_{01}C_{g12}} + \cfrac{1}{jB_{r13} + \cfrac{1}{\cfrac{1}{j\omega_{01}C_{out1}} + \cfrac{1}{G}}}}}}}} + \tag{24}$$

$$j\omega_{01}C^{m}_{in2} + \cfrac{1}{\cfrac{1}{j\omega_{01}C^{m}_{in3}} + \cfrac{1}{jB^{m}_{r31} + \cfrac{1}{\cfrac{1}{j\omega_{01}C_{g31}} + \cfrac{1}{G}}}} = G$$

$$\mathrm{Re}[Y_{in1}]|_{\omega=\omega_{01}} = G \tag{25}$$

$$\mathrm{Im}[Y_{in1}]|_{\omega=\omega_{01}} = 0$$

$$Y_{in2}|_{\omega=\omega_{02}} = \cfrac{1}{\cfrac{1}{j\omega_{02}C^{m}_{in2}} + \cfrac{1}{jB^{m}_{r21} + \cfrac{1}{\cfrac{1}{j\omega_{02}C_{g21}} + \cfrac{1}{jB_{r22} + \cfrac{1}{\cfrac{1}{j\omega_{02}C_{g22}} + \cfrac{1}{jB_{r23} + \cfrac{1}{\cfrac{1}{j\omega_{02}C_{out2}} + \cfrac{1}{G}}}}}}}} + \tag{26}$$

$$j\omega_{02}C^{m}_{in3} + \cfrac{1}{\cfrac{1}{j\omega_{02}C^{m}_{in1}} + \cfrac{1}{jB^{m}_{r11} + \cfrac{1}{\cfrac{1}{j\omega_{02}C_{g11}} + \cfrac{1}{G}}}} = G$$

$$\mathrm{Re}[Y_{in2}]|_{\omega=\omega_{02}} = G \tag{27}$$

$$\mathrm{Im}[Y_{in2}]|_{\omega=\omega_{02}} = 0$$

$$
Y_{in3}\,|_{\omega=\omega_{03}} = \cfrac{1}{\cfrac{1}{j\omega_{03}C^{m}_{in3}} + \cfrac{1}{jB^{m}_{r31} + \cfrac{1}{\cfrac{1}{j\omega_{03}C_{g31}} + \cfrac{1}{jB_{r32} + \cfrac{1}{\cfrac{1}{j\omega_{03}C_{g32}} + \cfrac{1}{jB_{r33} + \cfrac{1}{\cfrac{1}{j\omega_{03}C_{out3}} + \cfrac{1}{G}}}}}}}} + j\omega_{03}C^{m}_{in1} + \cfrac{1}{\cfrac{1}{j\omega_{03}C^{m}_{in2}} + \cfrac{1}{jB^{m}_{r21} + \cfrac{1}{\cfrac{1}{j\omega_{03}C_{g21}} + \cfrac{1}{G}}}} = G \tag{28}
$$

$$
\begin{aligned}
\mathrm{Re}[Y_{in3}]\,|_{\omega=\omega_{03}} &= G \\
\mathrm{Im}[Y_{in3}]\,|_{\omega=\omega_{03}} &= 0
\end{aligned} \tag{29}
$$

Figure 16:
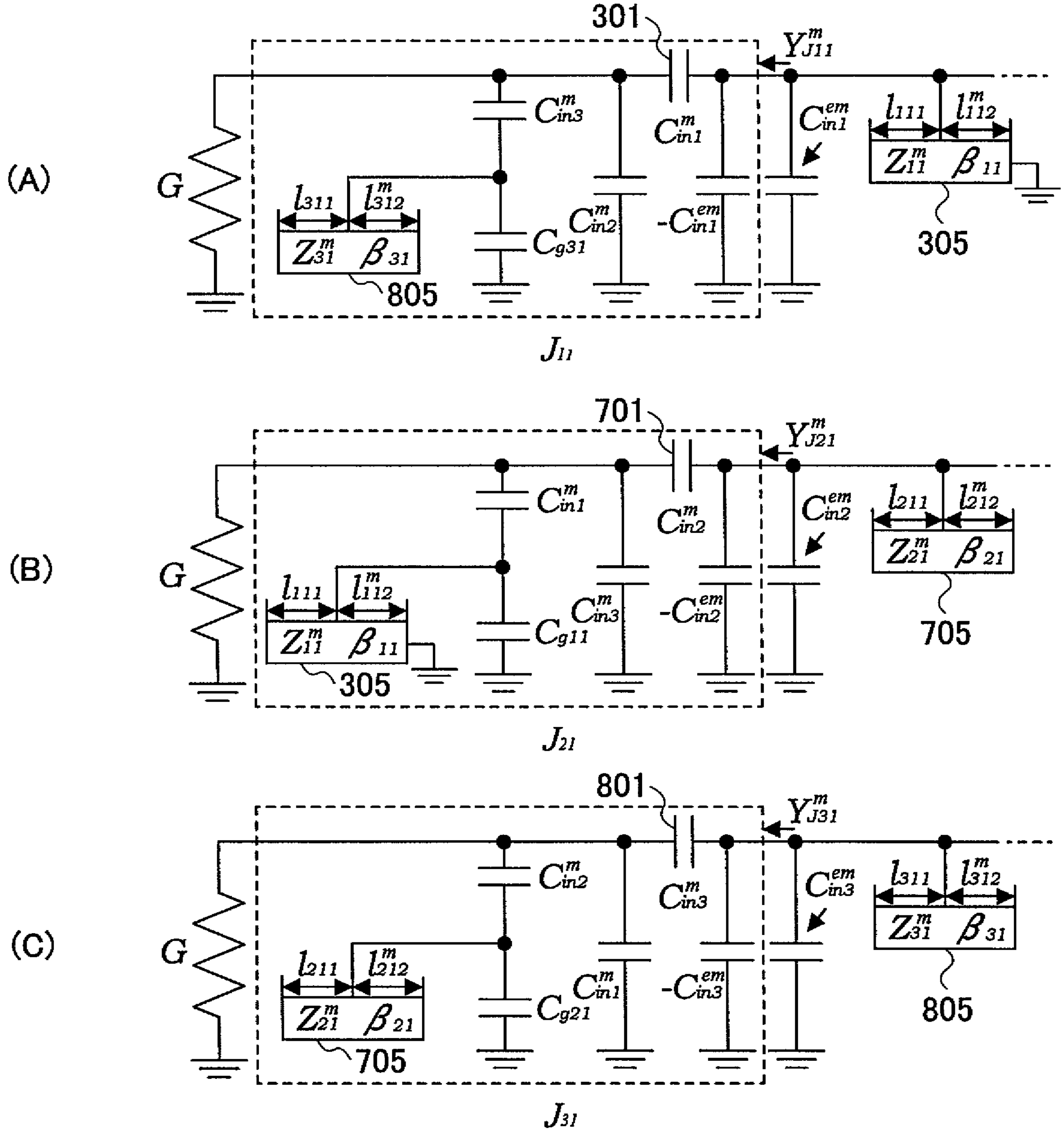
FIG. 16 shows an equivalent circuit using admittance inverters.

Next, in order to derive the capacitances $C^{m}_{in1}$, $C^{m}_{in3}$, $C^{m}_{in3}$, equivalent circuits are shown in FIG. 16 (A), (B), (C) using admittance inverters $J_{11}$, $J_{21}$, $J_{31}$.

In FIGS. 16 (A), (B), (C), in order to generate the admittance inverter $J_{11}$, positive and negative capacitances $C^{em}_{in1}$ and $-C^{em}_{in1}$, corresponding to first and second virtual coupling devices, are introduced. In order to generate the admittance inverter $J_{21}$, positive and negative capacitances $C^{em}_{in2}$ and $-C^{em}_{in2}$, corresponding to first and second virtual coupling devices, are introduced. In order to generate the admittance inverter $J_{31}$, positive and negative capacitances $C^{em}_{in3}$ and $-C^{em}_{in3}$, corresponding to first and second virtual coupling devices, are introduced.

In FIGS. 16 (A), (B), (C), relational expressions of input capacitances, negative devices and the admittance inverters can be expressed by (30), (31), and (32).

$$
\begin{aligned}
C_{in1} &= \frac{J_{11}}{\omega_{01}\sqrt{1-\left(\frac{J_{11}}{G}\right)^{2}}} \\
C_{in2} &= \frac{J_{21}}{\omega_{02}\sqrt{1-\left(\frac{J_{21}}{G}\right)^{2}}} \\
C_{in3} &= \frac{J_{31}}{\omega_{03}\sqrt{1-\left(\frac{J_{31}}{G}\right)^{2}}}
\end{aligned} \tag{30}
$$

-continued $$
\begin{aligned}
-C^{e}_{in1} &= \frac{J_{11}}{\omega_{01}}\sqrt{1-\left(\frac{J_{11}}{G}\right)^{2}} \\
-C^{e}_{in2} &= \frac{J_{21}}{\omega_{02}}\sqrt{1-\left(\frac{J_{21}}{G}\right)^{2}} \\
-C^{e}_{in3} &= \frac{J_{31}}{\omega_{03}}\sqrt{1-\left(\frac{J_{31}}{G}\right)^{2}}
\end{aligned} \tag{31}
$$

$$
\begin{aligned}
J_{11} &= \sqrt{\frac{\omega_{01}C_{r1}G\omega_{01}}{g_0 g_1 \omega_{c0}}} \\
J_{21} &= \sqrt{\frac{\omega_{02}C_{r2}G\omega_{02}}{g_0 g_1 \omega_{c0}}} \\
J_{31} &= \sqrt{\frac{\omega_{03}C_{r3}G\omega_{03}}{g_0 g_1 \omega_{c0}}}
\end{aligned} \tag{32}
$$

Further, in FIGS. 16 (A), (B), (C), assuming that input admittances are $Y^{m}_{J11}$, $Y^{m}_{J21}$, $Y^{m}_{J31}$, formulas (33) through (38) are shown. Further, when formula (39) holds, that is, by substituting formulas (33) through (38) into formula (39), relation expressions for the negative devices $-C^{em}_{in1}$, $-C^{em}_{in2}$ and $-C^{em}_{in3}$ can be derived. As a result, it can be confirmed that $J_{11}$, $J_{21}$ and $J_{31}$ operate as inverter circuits.

$$
Y_{J11} = \frac{\omega_{01}^{2}C_{in1}^{2}G}{G^{2}+\omega_{01}^{2}C_{in1}^{2}} + j\frac{\omega_{01}G^{2}(C_{in1}-C^{e}_{in1}) - \omega_{01}^{3}C_{in1}^{2}C^{e}_{in1}}{G^{2}+\omega_{01}^{2}C_{in1}^{2}} \tag{33}
$$

$$
Y_{J21} = \frac{\omega_{02}^{2}C_{in2}^{2}G}{G^{2}+\omega_{02}^{2}C_{in2}^{2}} + j\frac{\omega_{02}G^{3}(C_{in2}-C^{e}_{in2}) - \omega_{02}^{3}C_{in2}^{2}C^{e}_{in2}}{G^{2}+\omega_{02}^{2}C_{in2}^{2}} \tag{34}
$$

$$
Y_{J31} = \frac{\omega_{03}^{2}C_{in3}^{2}G}{G^{2}+\omega_{03}^{2}C_{in3}^{2}} + j\frac{\omega_{03}G^{3}(C_{in3}-C^{e}_{in3}) - \omega_{03}^{3}C_{in3}^{2}C^{e}_{in3}}{G^{2}+\omega_{03}^{2}C_{in3}^{2}} \tag{35}
$$

-continued $$Y^m_{J11} = -j\omega C^{em}_{in1}\frac{1}{\frac{1}{j\omega_{01}C^m_{in1}} + \frac{1}{G + j\omega_{01}C^m_{in1} + \frac{1}{\frac{1}{j\omega_{01}C^m_{in3}} + \frac{1}{jB_{r31} + j\omega_{01}C_{g31}}}}} \quad (36)$$

$$Y^m_{J21} = -j\omega C^{em}_{in2}\frac{1}{\frac{1}{j\omega_{02}C^m_{in2}} + \frac{1}{G + j\omega_{02}C^m_{in3} + \frac{1}{\frac{1}{j\omega_{02}C^m_{in1}} + \frac{1}{jB_{r11} + j\omega_{02}C_{g11}}}}} \quad (37)$$

$$Y^m_{J31} = -j\omega C^{em}_{in3}\frac{1}{\frac{1}{j\omega_{03}C^m_{in3}} + \frac{1}{G + j\omega_{03}C^m_{in1} + \frac{1}{\frac{1}{j\omega_{03}C^m_{in2}} + \frac{1}{jB_{r21} + j\omega_{03}C_{g21}}}}} \quad (38)$$

$$\begin{aligned}
\mathrm{Re}[Y_{J11}]|_{\omega=\omega_{01}} &= \mathrm{Re}[Y^m_{J11}]|_{\omega=\omega_{01}} \\
\mathrm{Im}[Y_{J11}]|_{\omega=\omega_{01}} &= \mathrm{Im}[Y^m_{J11}]|_{\omega=\omega_{01}} \\
\mathrm{Re}[Y_{J21}]|_{\omega=\omega_{02}} &= \mathrm{Re}[Y^m_{J21}]|_{\omega=\omega_{02}} \\
\mathrm{Im}[Y_{J21}]|_{\omega=\omega_{02}} &= \mathrm{Im}[Y^m_{J21}]|_{\omega=\omega_{02}} \\
\mathrm{Re}[Y_{J31}]|_{\omega=\omega_{03}} &= \mathrm{Re}[Y^m_{J31}]|_{\omega=\omega_{03}} \\
\mathrm{Im}[Y_{J31}]|_{\omega=\omega_{03}} &= \mathrm{Im}[Y^m_{J31}]|_{\omega=\omega_{03}}
\end{aligned} \quad (39)$$

Next, in FIGS. 16 (A), (B), (C), assuming that respective input susceptances of the resonators 305, 705, 805 are $B''_{r11}$, $B''_{r21}$, $B''_{r31}$, input susceptance $B''_{in11}$ of the resonator 305 at $f=f_{01}(\omega=\omega_{01})$, input susceptance $B''_{in21}$ of the resonator 705 at $f=f_{02}(\omega=\omega_{02})$, and input susceptance $B''_{in31}$ of the resonator 805 at $f=f_{03}(\omega=\omega_{03})$ can be expressed by formulas (40), (42), (44). Further, in order that susceptance slope parameters $b''_{11}$, $b''_{21}$, $b''_{31}$ agree with respective susceptance slope parameters $\omega_{01}C_{r1}$, $\omega_{02}C_{r2}$, $\omega_{03}C_{r3}$ of lumped constant type LC parallel resonators at $\omega=\omega_{01}$, $\omega=\omega_{02}$, $\omega=\omega_{03}$, formulas (41), (43), (45) should be met.

$$\begin{aligned}
B^m_{in11}|_{\omega=\omega_{01}} &= B^m_{r11} + \omega_{01}(C^{em}_{in1} + C_{g11}) \\
&= \frac{\tan\beta^m_{11}l^m_{111} + \tan\beta^m_{11}l_{112}}{Z^m_{11}} + \omega_{01}(C^{em}_{in1} + C_{g11}) \\
&= 0
\end{aligned} \quad (40)$$

$$b^m_{in11} = \frac{\omega_{01}}{2}\frac{dB^m_{in11}}{d\omega}\Big|_{\omega=\omega_{01}} - \omega_{01}C_{r1} \quad (41)$$

$$\begin{aligned}
B^m_{in21}|_{\omega=\omega_{02}} &= B^m_{r21} + \omega_{02}(C^{em}_{in2} + C_{g21}) \\
&= \frac{\tan\beta^m_{21}l^m_{211} + \tan\beta^m_{21}l_{212}}{Z^m_{21}} + \omega_{02}(C^{em}_{in2} + C_{g21}) \\
&= 0
\end{aligned} \quad (42)$$

-continued $$b^m_{in11} = \frac{\omega_{01}}{2}\frac{dB^m_{in11}}{d\omega}\Big|_{\omega=\omega_{01}} - \omega_{01}C_{r1} = 0 \quad (43)$$

$$\begin{aligned}
B^m_{in31}|_{\omega=\omega_{03}} &= B^m_{r31} + \omega_{03}(C^{em}_{in3} + C_{g31}) \\
&= \frac{\tan\beta^m_{31}l^m_{311} + \tan\beta^m_{31}l_{312}}{Z^m_{21}} + \omega_{03}(C^{em}_{in3} + C_{g31}) \\
&= 0
\end{aligned} \quad (44)$$

$$b^m_{31} = \frac{\omega_{03}}{2}\frac{dB^m_{in31}}{d\omega}\Big|_{\omega=\omega_{03}} - \omega_{03}C_{r3} = 0 \quad (45)$$

Figure 17:
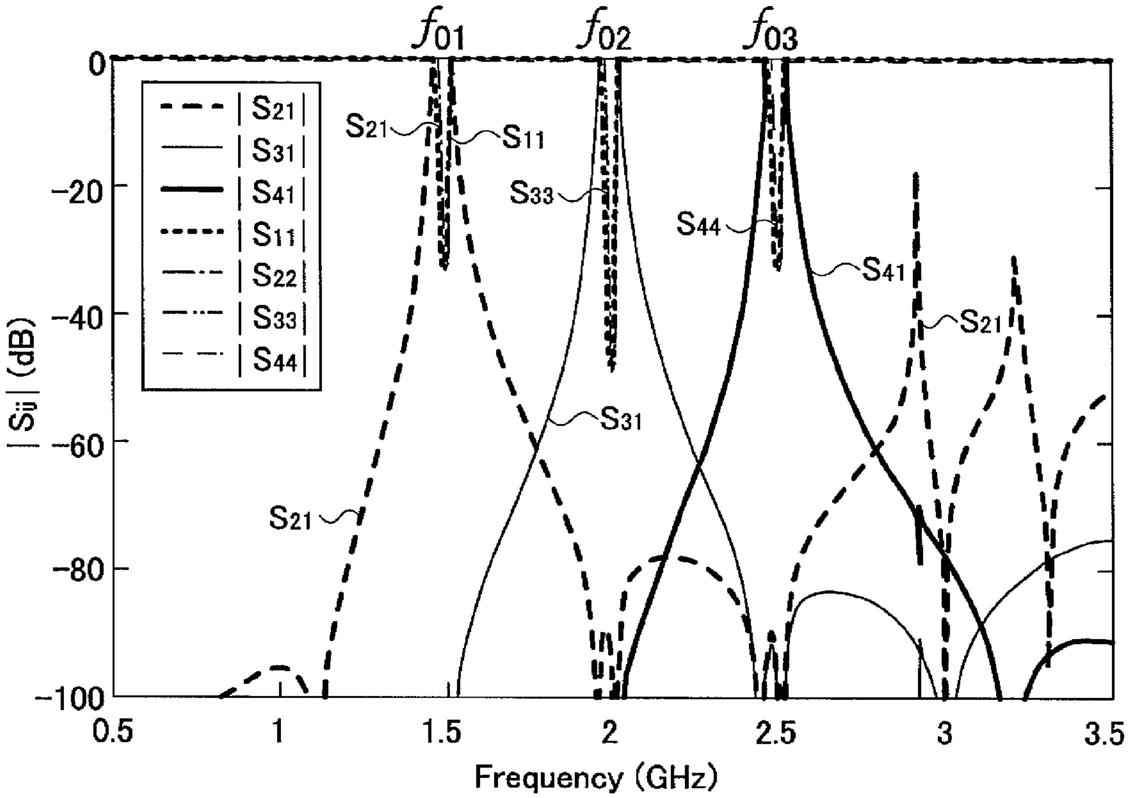
FIG. 17 shows transmission and reflection characteristics from simulation.
Figure 18:
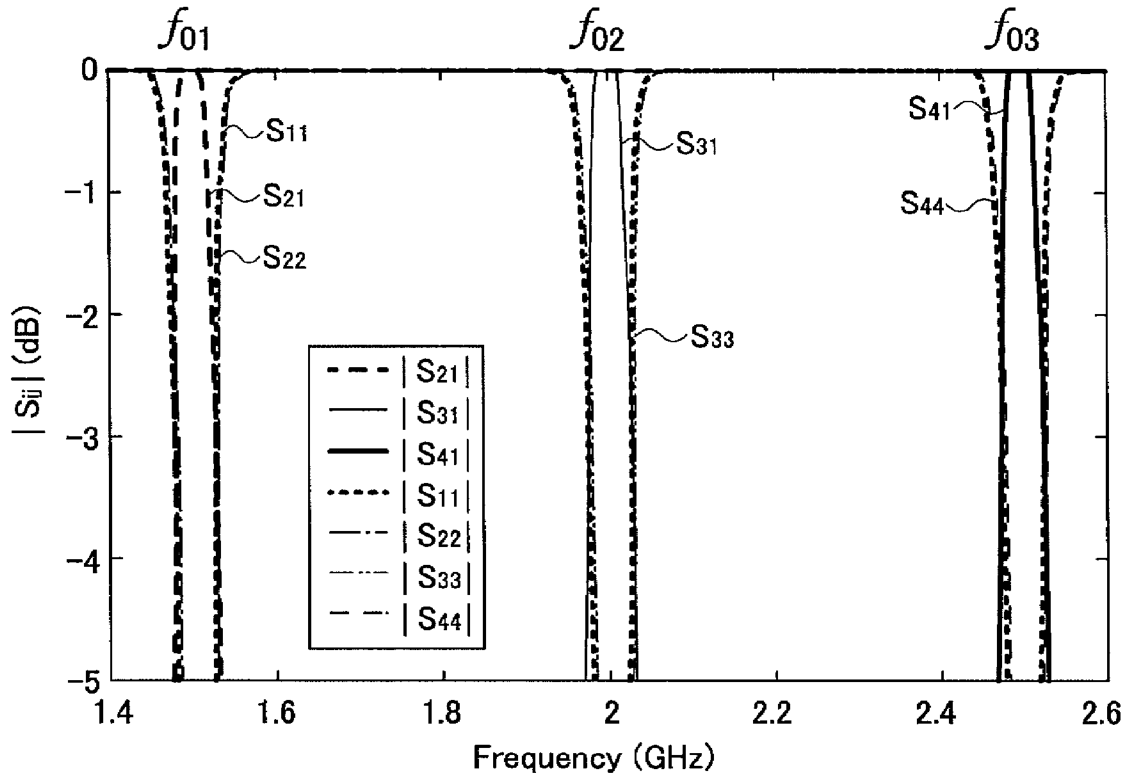
FIG. 18 shows passing band characteristics from simulation
Figure 19:
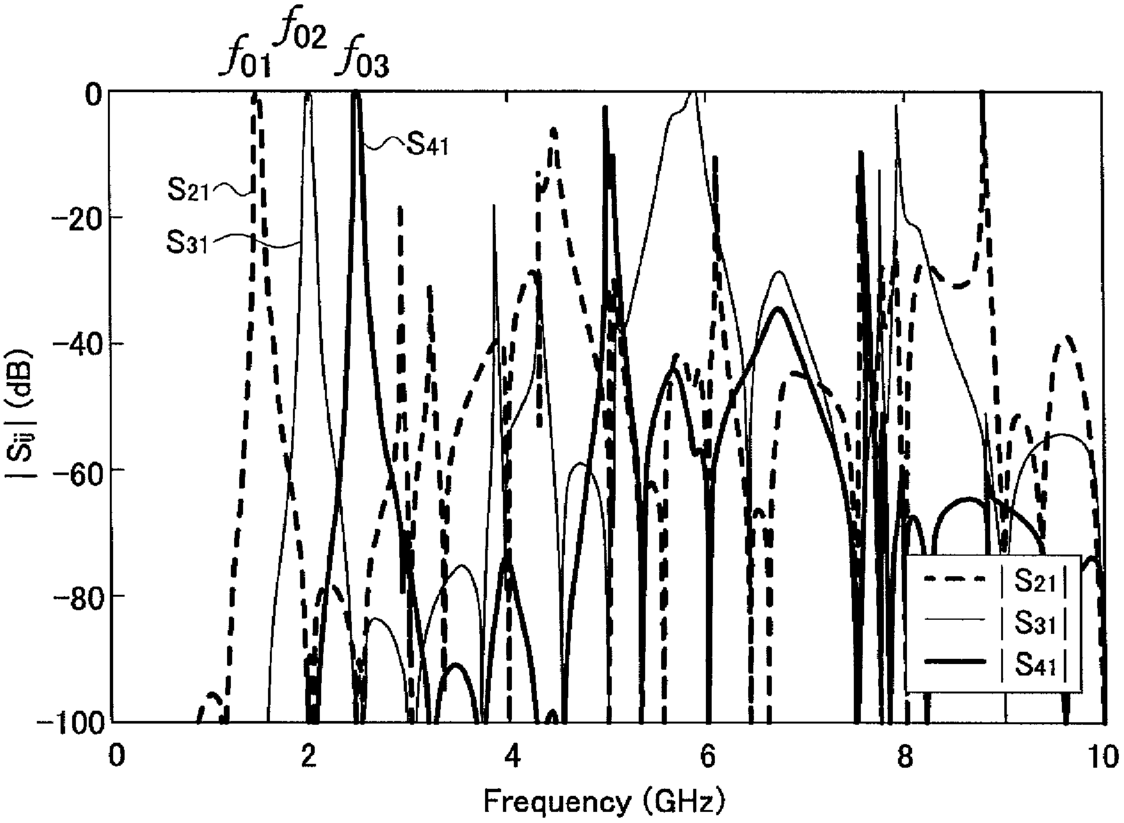
FIG. 19 shows wide band transmission characteristics from simulation
Figure 20:
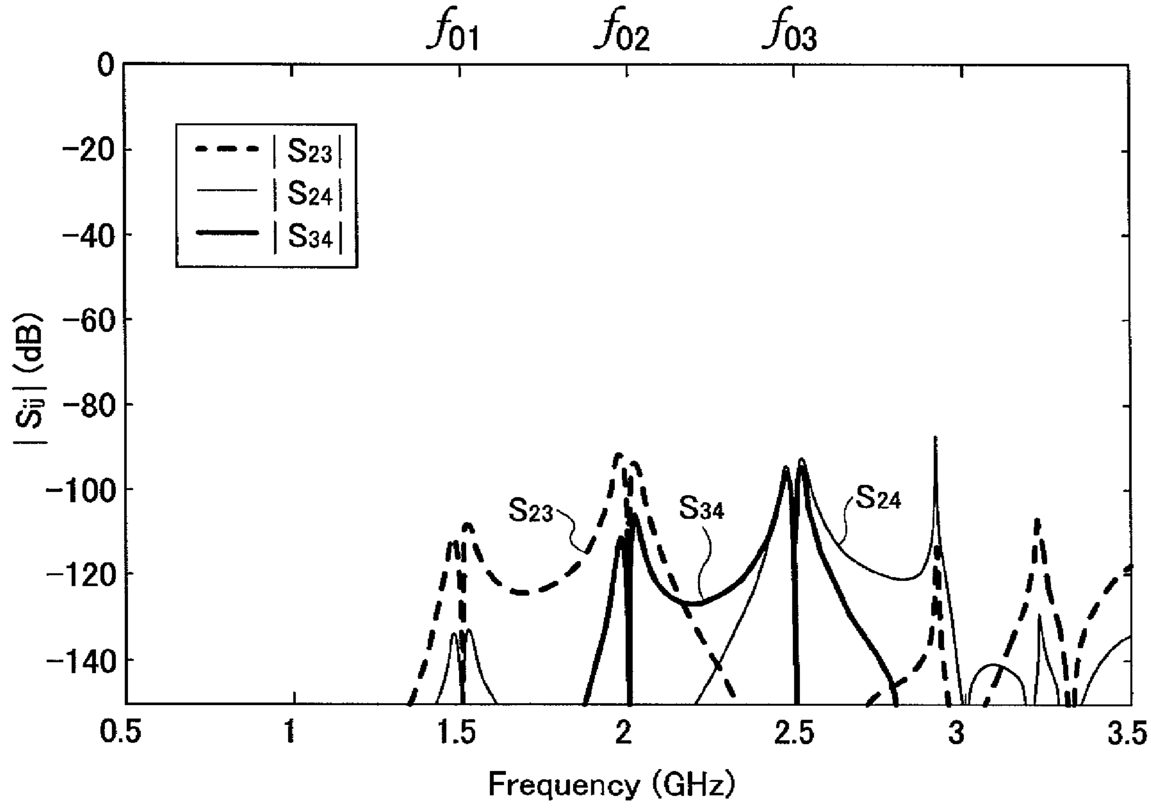
FIG. 20 shows isolation characteristics from simulation

Table 1 shows device values of the respective capacitive devices and the respective resonators of the bandpass filters 300 (BPF1), 700 (BPF2), 800 (BPF3), calculated in the above-mentioned designing method for the triplexer shown in FIG. 14. Further, FIG. 17 shows transmission and reflection characteristics from simulation carried out with the use of the values shown in Table 1. FIG. 18 shows passing band characteristics from the above-mentioned simulation. FIG. 19 shows wide band transmission characteristics from the above-mentioned simulation. FIG. 20 shows isolation characteristics from the above-mentioned simulation.

TABLE 1

| BPF1 | | BPF2 | | BPF3 | |
|---|---|---|---|---|---|
| $C_{in1}{}^m$ | 1.231 pF | $C_{in2}{}^m$ | 1.0865 pF | $C_{in3}{}^m$ | 1.005 pF |
| $C_{out1}$ | 0.7155861 pF | $C_{out2}$ | 0.5366896 pF | $C_{out3}$ | 0.4293517 pF |
| $C_{g11}$ | 0.1532065 pF | $C_{g21}$ | 0.1149048 pF | $C_{g31}$ | 0.09192388 pF |
| $C_{g12}$ | 0.1532065 pF | $C_{g22}$ | 0.1149048 pF | $C_{g32}$ | 0.09192388 pF |

TABLE 1-continued

| RESONATOR 305 | | RESONATOR 705 | | RESONATOR 805 | |
|---|---|---|---|---|---|
| $Z_{11}'''$ | 44.05 Ω | $Z_{21}'''$ | 63.4401 Ω | $Z_{31}'''$ | 90.35 Ω |
| $l_{111}$ | 29.9792 mm | $l_{211}$ | 49.9654 mm | $l_{311}$ | 37.4741 mm |
| $l_{112}'''$ | 16.02 mm | $l_{212}'''$ | 18.95 mm | $l_{312}'''$ | 17.34 mm |
| **RESONATOR 306** | | **RESONATOR 706** | | **RESONATOR 806** | |
| $Z_{12}$ | 53.3063 Ω | $Z_{22}$ | 57.4421 Ω | $Z_{32}$ | 20.3546 Ω |
| $l_{121}$ | 74.9481 mm | $l_{221}$ | 59.9585 mm | $l_{321}$ | 49.9654 mm |
| $l_{122}$ | 22.7132 mm | $l_{222}$ | 13.7235 mm | $l_{322}$ | 9.13029 mm |
| **RESONATOR 307** | | **RESONATOR 707** | | **RESONATOR 807** | |
| $Z_{13}$ | 79.2928 Ω | $Z_{23}$ | 42.0074 Ω | $Z_{33}$ | 72.9559 Ω |
| $l_{131}$ | 24.9827 mm | $l_{231}$ | 24.9827 mm | $l_{331}$ | 23.4213 mm |
| $l_{132}$ | 67.7817 mm | $l_{232}$ | 10.8406 mm | $l_{332}$ | 5.54901 mm |

$S_{11}$, denotes a reflection coefficient in the antenna 200, $S_{22}$ denotes a reflection coefficient in the transmission port 308 of the transmission side bandpass filter 300, $S_{21}$ denotes a transmission coefficient from the antenna 200 to the transmission port 308 of the transmission side bandpass filter 700, $S_{33}$ denotes a reflection coefficient in the port 708 of the reception side bandpass filter 700, $S_{31}$ denotes a transmission coefficient from the antenna 200 to the port 708 of the transmission side bandpass filter 700, $S_{44}$ denotes a reflection coefficient in the port 808 of the reception side bandpass filter 800, $S_{41}$ denotes a transmission coefficient from the antenna 200 to the port 808 of the transmission side bandpass filter 800. $S_{23}$ denotes a mutual interference coefficient between the transmission side bandpass filter 300 and the reception side bandpass filter 700, $S_{24}$ denotes a mutual interference coefficient between the transmission side bandpass filter 300 and the reception side bandpass filter 800, $S_{34}$ denotes a mutual interference coefficient between the reception side bandpass filter 700 and the reception side bandpass filter 800.

It is noted that although the simulation was carried out with the values shown in Table 1, rounding to two decimals may be carried out for example for actual application. In this case, the reflectance characteristics of FIG. 17 degrade somewhat. However, there is no problem in a practical view point.

From FIGS. 17 and 18, it can be confirmed that, in each passing band, the desired characteristics have been obtained. Further, also from the result of FIG. 20, it could be confirmed that, from the effects of displacement of attenuation poles at the respective center frequencies $f_{01}$, $f_{02}$, $f_{03}$, higher isolation characteristics could be achieved.

The present application claims priority based on Japanese Patent Application No. 2005-257186, filed on Sep. 5, 2005, the entire contents of which are hereby incorporated herein by reference.

The invention claimed is:

1. A multiplexing circuit comprising:

two or more bandpass filters, for passing signals of mutually different frequency bands therethrough, each comprising one or more stages of units each having a coupling device and a resonance circuit connected at any point in a longitudinal direction of a distributed constant line to one end of the coupling device, wherein:

one ends of the respective bandpass filters are directly connected to a common port, and the coupling devices and the resonance circuits of the first stage nearest to said port of the respective bandpass filters have functions of impedance matching parts of the respective bandpass filters, in addition to functions of resonance parts, respectively.

2. The multiplexing circuit as claimed in claim 1, wherein:

values of the respective coupling devices in the first stage and impedances, coupling positions that are connection points between the distributed constant lines and the coupling devices, and phase constants of the respective resonance circuits of the first stage are selected in such a manner that signal passing bands of the respective bandpass filters are desired frequencies, respectively and, as a result, the respective coupling devices of the first stage and the respective resonance circuits of the first stage have the functions of the impedance matching parts of the respective bandpass filters, in addition to the functions of the resonance parts.

3. The multiplexing circuit as claimed in claim 1 or 2, wherein:

each bandpass filter is designed in such a manner that, at a respective center frequency, when a signal is made to pass through a required bandpass filter, a contact point of the resonance circuit in another bandpass filter is in a short-circuit state so that admittance viewed from the side of the port of the required bandpass filter has a desired value, in the short-circuit state, taking a first virtual coupling device corresponding to the coupling device into consideration, admittance viewed from the side of said port of the coupling device of the required bandpass filter, the coupling device of the another bandpass filter which influences the required bandpass filter and the first virtual coupling device has a desired value, for the required bandpass filter, taking a second virtual coupling device which is a counterpart of the first virtual coupling device into consideration, a circuit system including the resonance circuit and the second coupling device meets a resonance condition at a desired center frequency, and, a susceptance slope parameter of the part including the resonance circuit and the second virtual coupling device agrees with a susceptance slope parameter of a lumped constant device type resonance circuit corresponding to the resonance circuit.

4. The multiplexing circuit as claimed in claim 1 or 2, wherein:

the plurality of bandpass filters include a transmitting side bandpass filter for passing a transmission signal therethrough, and a reception side bandpass filter for passing a reception signal therethrough, and said port is connected to an antenna.

5. The multiplexing circuit as claimed in claim 1 or 2, wherein:

a length of a stub on one side of the resonance circuit of one bandpass filter of the plurality of bandpass filters is designed in such a manner as to generate an attenuation pole corresponding to a passing band frequency of another bandpass filter, wherein the length of the stub on one side of the resonance circuit of one bandpass filter of the plurality of bandpass filters is a length from a connection point of the distributed constant line with the coupling device to an end on the one side of the distributed constant line.

6. A designing method for a multiplexing circuit, comprising:

directly connecting one ends of two or more bandpass filters to a common port, which bandpass filters are for passing signals of mutually different frequency bands therethrough, and each of which bandpass filters comprises at least a coupling device and a resonance circuit connected at any point in a longitudinal direction of a distributed constant line to one end of the coupling device, wherein:

each bandpass filter is designed in such a manner that, at a respective center frequency, when a signal is made to pass through a required bandpass filter, a contact point of the resonance circuit in another bandpass filter is in a short-circuit state so that admittance viewed from the side of the port of the required bandpass filter has a desired value, in the short-circuit state, taking a first virtual coupling device corresponding to the coupling device into consideration, admittance viewed from the side of said port of the coupling device of the required bandpass filter, the coupling device of the another bandpass filter which influences the required bandpass filter and the first virtual coupling device has a desired value, for the required bandpass filter, taking a second virtual coupling device which is a counterpart of the first virtual coupling device into consideration, a part including the resonance circuit and the second coupling device meets a resonance condition at a desired center frequency, and, a susceptance slope parameter of the part including the resonance circuit and the second virtual coupling device agrees with a susceptance slope parameter of a lumped constant device type resonance circuit corresponding to the resonance circuit.

* * * * *